United States Patent
Raether

(10) Patent No.: US 11,931,681 B2
(45) Date of Patent: Mar. 19, 2024

(54) AIR FILTER SYSTEMS AND METHODS OF USING THE SAME

(71) Applicant: DONALDSON COMPANY, INC., Minneapolis, MN (US)

(72) Inventor: Thomas D. Raether, St. Louis Park, MN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 41 days.

(21) Appl. No.: 16/290,246

(22) Filed: Mar. 1, 2019

(65) Prior Publication Data
US 2019/0193012 A1 Jun. 27, 2019

Related U.S. Application Data

(63) Continuation of application No. 14/772,268, filed as application No. PCT/US2014/020241 on Mar. 4, 2014, now Pat. No. 10,245,543.
(Continued)

(51) Int. Cl.
*B01D 46/00* (2022.01)
*B01D 46/24* (2006.01)
(Continued)

(52) U.S. Cl.
CPC .......... *B01D 46/71* (2022.01); *B01D 46/2411* (2013.01); *B01D 46/60* (2022.01)

(58) Field of Classification Search
CPC ................ B01D 46/00; B01D 46/0068; B01D 46/0021; B01D 46/2411
(Continued)

(56) References Cited

U.S. PATENT DOCUMENTS 3,417,551 A  12/1968  Bonell
3,509,698 A   5/1970  Medcalf et al.
(Continued)

FOREIGN PATENT DOCUMENTS

CN   2172673 Y   7/1994
CN   2218327     1/1996
(Continued)

OTHER PUBLICATIONS

Anonymous: "Air Filter Cartridge 691667" Jul. 1, 2014, retrieved from the Internet: URL: http://www.briggsandstratton.com/us/en/shop/parts-and-accessories/filters/air%20filter%20cartridge%20691667. Retrieved on Jul. 2, 2014.
(Continued)

*Primary Examiner* — T. Bennett McKenzie
(74) *Attorney, Agent, or Firm* — Mueting Raasch Group

(57) ABSTRACT

The air filter systems described herein include one or more pulse collectors and pulse generators aligned along pulse axes. The pulse generators and filter elements may be arranged along a pulse distance as measured from a pulse outlet to a filter element opening. The pulse collectors and the filter elements may have openings with a relationship between them within parameters described herein. The pulse collectors may have a relationship between their hydraulic diameter and their length within parameters described herein. The pulse collectors may include a filter section and a pulse section that meet at a junction along a length of the pulse collector. The pulse sections may have a hydraulic diameter that increases when moving from the junction to the tube sheet opening of the pulse section. The filter sections may have a hydraulic diameter that remains constant when moving from the junction to the filter end opening of the filter section. Filter elements/cartridges used
(Continued)

in the air filter systems may have filter media shaped or formed into ovate cross-sections.

27 Claims, 23 Drawing Sheets

Related U.S. Application Data

(60) Provisional application No. 61/943,036, filed on Feb. 21, 2014, provisional application No. 61/789,385, filed on Mar. 15, 2013, provisional application No. 61/772,198, filed on Mar. 4, 2013.

(51) Int. Cl.
*B01D 46/60* (2022.01)
*B01D 46/71* (2022.01)

(58) Field of Classification Search
USPC .................................................. 55/282–305
See application file for complete search history.

(56) References Cited

U.S. PATENT DOCUMENTS

| | | | |
|---|---|---|---|
| 3,683,595 A | 8/1972 | Houghton et al. | |
| 3,771,295 A | 11/1973 | Wheeler, Jr. | |
| 3,778,985 A | 12/1973 | Daigle et al. | |
| 3,853,508 A | 12/1974 | Gordon et al. | |
| 3,874,857 A | 4/1975 | Hunt et al. | |
| 3,942,962 A | 3/1976 | Duyckinck | |
| 4,029,966 A | 6/1977 | Baker et al. | |
| 4,157,899 A | 6/1979 | Wheaton | |
| 4,214,882 A | 7/1980 | Brenholt | |
| 4,218,227 A | 8/1980 | Frey | |
| 4,247,313 A | 1/1981 | Perry, Jr. et al. | |
| 4,253,856 A | 3/1981 | Paucha | |
| 4,270,935 A * | 6/1981 | Reinauer | B01D 46/06 55/528 |
| 4,272,262 A * | 6/1981 | Britt | B01D 46/0068 55/302 |
| 4,280,826 A | 7/1981 | Johnson, Jr. | |
| 4,299,597 A | 11/1981 | Oetiker et al. | |
| 4,306,890 A | 12/1981 | Gustavsson et al. | |
| 4,319,897 A * | 3/1982 | Labadie | B01D 46/58 417/198 |
| 4,395,269 A | 7/1983 | Schuler | |
| 4,424,070 A | 1/1984 | Robinson | |
| 4,436,536 A | 3/1984 | Robinson | |
| 4,443,237 A | 4/1984 | Ulvestad | |
| 4,445,915 A | 5/1984 | Robinson | |
| 4,578,092 A | 3/1986 | Klimczak | |
| 4,632,680 A | 12/1986 | Klimczak | |
| 4,645,520 A | 2/1987 | Hüttlin | |
| 4,661,131 A | 4/1987 | Howeth | |
| 4,715,954 A | 12/1987 | DeGraffenreid | |
| 4,789,387 A | 12/1988 | Nemesi et al. | |
| 4,954,255 A | 9/1990 | Mueller et al. | |
| 5,002,594 A | 3/1991 | Merritt | |
| 5,062,867 A | 11/1991 | Klimczak | |
| 5,190,651 A | 3/1993 | Spencer et al. | |
| 5,207,812 A | 5/1993 | Tronto et al. | |
| 5,211,846 A | 5/1993 | Kott et al. | |
| 5,222,488 A | 6/1993 | Forsgren | |
| 5,395,409 A | 3/1995 | Klimczak et al. | |
| 5,505,763 A | 4/1996 | Reighard et al. | |
| 5,562,746 A * | 10/1996 | Raether | B01D 46/4281 95/280 |
| 5,616,171 A | 4/1997 | Barris et al. | |
| 5,730,766 A | 3/1998 | Clements | |
| 5,742,314 A | 4/1998 | Hayes | |
| 5,846,260 A | 12/1998 | Maahs | |
| 5,851,390 A | 12/1998 | Lemonnier | |
| D417,268 S | 11/1999 | Gillingham | |
| 6,022,388 A | 2/2000 | Andersson et al. | |
| 6,090,173 A * | 7/2000 | Johnson | B01D 46/04 95/280 |
| 6,129,852 A | 10/2000 | Elliot et al. | |
| 6,149,716 A | 11/2000 | Bach et al. | |
| RE37,163 E | 5/2001 | Oussoren et al. | |
| 6,270,732 B1 | 8/2001 | Gardner et al. | |
| 6,387,162 B1 | 5/2002 | Kosmider et al. | |
| 6,394,921 B1 | 5/2002 | Fukuda | |
| 6,488,746 B1 | 12/2002 | Kosmider et al. | |
| 6,605,139 B2 | 8/2003 | Felix | |
| D484,584 S | 12/2003 | Anderson et al. | |
| 6,716,274 B2 | 4/2004 | Gogins et al. | |
| D499,177 S | 11/2004 | Kosmider et al. | |
| 6,902,592 B2 | 6/2005 | Green et al. | |
| 6,908,494 B2 | 6/2005 | Gillingham et al. | |
| 7,008,465 B2 | 3/2006 | Graham et al. | |
| 7,195,659 B2 | 3/2007 | Sporre et al. | |
| D545,396 S | 6/2007 | Casey et al. | |
| 7,282,077 B2 | 10/2007 | Honisch et al. | |
| 7,371,267 B2 | 5/2008 | Pipkorn et al. | |
| 7,481,863 B2 | 1/2009 | Oelpke et al. | |
| 7,520,913 B2 | 4/2009 | Mills et al. | |
| 7,611,561 B2 | 11/2009 | Hill, Jr. et al. | |
| 7,641,708 B2 | 1/2010 | Kosmider et al. | |
| 7,699,042 B2 | 4/2010 | Steinman et al. | |
| 7,918,907 B2 | 4/2011 | Bitner | |
| 7,967,898 B2 | 6/2011 | Sporre et al. | |
| 8,075,648 B2 | 12/2011 | Raether | |
| 8,118,900 B2 | 2/2012 | Raether et al. | |
| D656,160 S | 3/2012 | Strommen et al. | |
| 8,128,724 B2 | 3/2012 | Mills et al. | |
| 8,206,483 B2 | 6/2012 | Rieger | |
| 8,356,716 B1 | 1/2013 | Kruckenberg et al. | |
| 8,413,818 B1 | 4/2013 | Kruckenberg et al. | |
| 8,491,708 B2 | 7/2013 | Raether | |
| 8,580,109 B2 | 11/2013 | Kruckenberg et al. | |
| 8,591,736 B2 | 11/2013 | Kruckenberg et al. | |
| 8,679,215 B2 | 3/2014 | Lim et al. | |
| 9,067,164 B2 | 6/2015 | Raether | |
| 9,126,132 B2 | 9/2015 | Raether | |
| 9,604,172 B2 | 3/2017 | Raether | |
| 2004/0079231 A1* | 4/2004 | Green | B01D 46/4281 95/280 |
| 2006/0075726 A1 | 4/2006 | Yoshimoto | |
| 2006/0112667 A1 | 6/2006 | Sporre et al. | |
| 2007/0131606 A1 | 6/2007 | Volkmar et al. | |
| 2007/0256395 A1 | 11/2007 | Kosmider | |
| 2008/0022855 A1 | 1/2008 | Clements | |
| 2008/0022856 A1* | 1/2008 | Clements | B01D 46/04 95/280 |
| 2008/0092501 A1 | 4/2008 | Sporre et al. | |
| 2008/0115668 A1 | 5/2008 | Haavisto et al. | |
| 2008/0127825 A1 | 6/2008 | Raether | |
| 2008/0127826 A1 | 6/2008 | Raether | |
| 2008/0127827 A1 | 6/2008 | Raether | |
| 2009/0114095 A1 | 5/2009 | Hanson et al. | |
| 2009/0205445 A1 | 8/2009 | Raether | |
| 2009/0217630 A1 | 9/2009 | Bitner | |
| 2009/0272082 A1 | 11/2009 | Nahey et al. | |
| 2010/0024639 A1 | 2/2010 | Taylor | |
| 2010/0275776 A1 | 11/2010 | Ray | |
| 2011/0041692 A1 | 2/2011 | Raether | |
| 2011/0185689 A1 | 8/2011 | Raether et al. | |
| 2012/0011815 A1* | 1/2012 | Raether | B01D 46/527 55/357 |
| 2012/0031058 A1 | 2/2012 | Coulonvaux et al. | |
| 2012/0090284 A1 | 4/2012 | McGinnis et al. | |
| 2012/0159910 A1 | 6/2012 | Mills et al. | |
| 2012/0160755 A1 | 6/2012 | LaCroix et al. | |
| 2012/0192537 A1 | 8/2012 | Coulonvaux et al. | |
| 2012/0275776 A1 | 11/2012 | Gagnon et al. | |
| 2012/0324842 A1* | 12/2012 | Schumann | B01D 46/08 55/303 |
| 2014/0245704 A1 | 9/2014 | Raether | |

(56) References Cited

U.S. PATENT DOCUMENTS

| | | |
|---|---|---|
| 2014/0260142 A1 | 9/2014 | Raether |
| 2015/0298038 A1 | 10/2015 | Raether |

FOREIGN PATENT DOCUMENTS

| | | |
|---|---|---|
| CN | 1130129 | 9/1996 |
| CN | 1307505 A | 8/2001 |
| CN | 2633405 Y | 8/2004 |
| CN | 1714911 A | 1/2006 |
| CN | 2855519 | 1/2007 |
| CN | 101048214 A | 10/2007 |
| CN | 201008342 | 1/2008 |
| CN | 101134149 A | 3/2008 |
| CN | 101257959 | 9/2008 |
| CN | 201140010 Y | 10/2008 |
| CN | 101439251 A | 5/2009 |
| CN | 101541395 A | 9/2009 |
| CN | 101553299 A | 10/2009 |
| CN | 101637684 A | 2/2010 |
| CN | 102015061 A | 4/2011 |
| CN | 201912861 U | 8/2011 |
| CN | 102811790 A | 12/2012 |
| DE | 1094108 B1 | 12/1960 |
| DE | 1526667 B1 | 12/1969 |
| DE | 19960138 A1 | 6/2001 |
| DE | 102004005904 A1 | 9/2005 |
| DE | 102011018715 A1 | 10/2012 |
| EP | 0 014 987 | 9/1980 |
| EP | 0 026 641 | 4/1981 |
| EP | 0026641 A2 | 4/1981 |
| EP | 0 754 850 A1 | 7/1995 |
| EP | 0 591 493 | 1/1996 |
| EP | 0 754 850 | 1/1997 |
| EP | 1312787 A1 | 5/2003 |
| EP | 1 795 743 B1 | 10/2006 |
| EP | 1 795 743 | 12/2009 |
| EP | 2265354 A2 | 12/2010 |
| FR | 896769 A | 3/1945 |
| GB | 761726 | 11/1956 |
| JP | S55-500437 A | 7/1980 |
| JP | 2007522928 A | 8/2007 |
| WO | 83/01209 | 4/1983 |
| WO | 95/27552 | 10/1995 |
| WO | WO 95/27552 A1 | 10/1995 |
| WO | 98/49952 A1 | 11/1998 |
| WO | 2007/005939 | 1/2007 |
| WO | WO 2009/039285 A1 | 3/2009 |
| WO | 2009/124284 A2 | 10/2009 |
| WO | 2012/146557 | 11/2012 |
| WO | WO 2012/146557 | 11/2012 |
| WO | WO 2013/173691 A1 | 11/2013 |
| WO | WO 2013/173692 A1 | 11/2013 |
| WO | 2014/143778 | 9/2014 |
| WO | WO 2014/138034 A1 | 12/2014 |
| WO | WO 2014/143778 A8 | 9/2015 |

OTHER PUBLICATIONS

Anonymous: "Air Filter Cartridge 795066" Jul. 1, 2014, retrieved from the Internet: URL: http://www.briggsandstratton.com/us/en/shop/parts-and-accessories/filters/air%20filter%20cartridge%20795066. Retrieved on Jul. 2, 2014.

International Patent Application No. PCT/US2014/027884, filed Mar. 14, 2014; International Search Report / Written Opinion dated Jul. 21, 2014; 11 pages.

International Patent Application No. PCT/US2014/020241, filed Mar. 4, 2014; International Search Report / Written Opinion dated Jun. 24, 2014; 12 pages.

International Patent Application No. PCT/US2014/020241, filed Mar. 4, 2014; International Preliminary Report on Patentability dated Sep. 8, 2015; 9 pages.

International Patent Application No. PCT/US2014/027884, filed Mar. 14, 2014; International Preliminary Report on Patentability dated Sep. 15, 2015, 8 pages.

Chinese Patent Application No. 201910782384 X, filed Mar. 4, 2014, First Office Action and Search Report dated Jan. 19, 2021, 14 pages. Translation provided.

Chen, "Research Progress in Ceramic Filters Used in Hot Gas Filtration", Sep. 30, 2008, Journal of Ningbo University (NSEE), 21(3):423-427. English Abstract included.

Zhang; et al., "Characterization of Flow Field in the Exit of Pulse Jet Nozzle for High-temperature Filtrating", Oct. 15, 2009, Journal of Mechanical Engineering, 45(10):96-100. English Abstract included.

Qiu et al, "Transient Flow Model Solution of Reverse Jet Pulse Cleaning System in High Temperature Ceramic Filter" 2004, *Journal of Xi'an Jiaotong University*, pp. 15-18. (Abstract only and English translation of Abstract). See Chinese Application No. CN202111035774.4, Office Action dated Jul. 15, 2022, for statement of relevance.

Zhao et al, "Performance measurement and analysis of ceramic filter pulse cleaning system" 2006, *Combustion Science and Technology*, pp. 362-368 (Abstract only and English translation of Abstract). See Chinese Application No. CN202111035774.4, Office Action dated Jul. 15, 2022, for statement of relevance.

CN Office Action CN202111035774.4, filed Mar. 4, 2014, Office Action dated Jul. 15, 2022, English language translation included.

\* cited by examiner

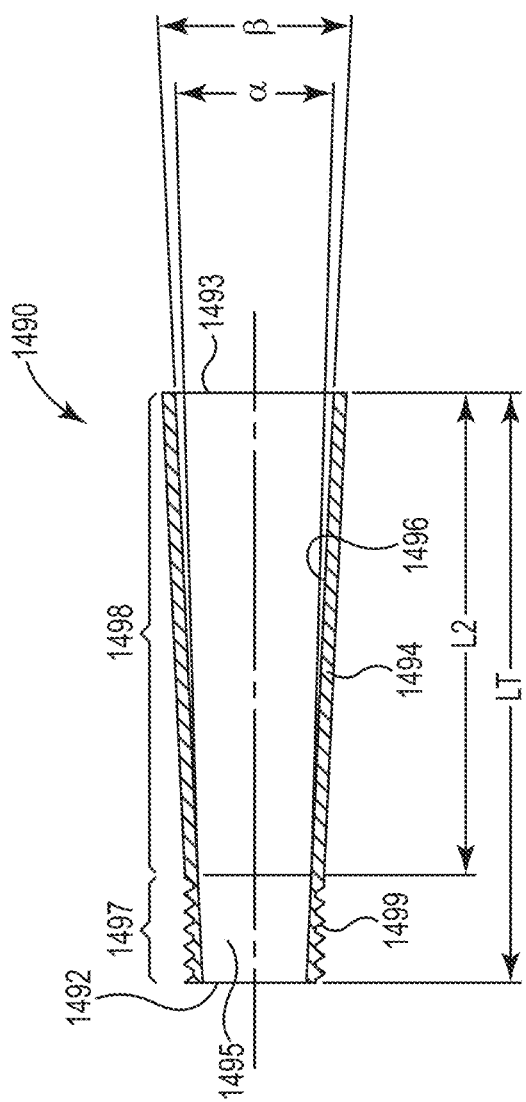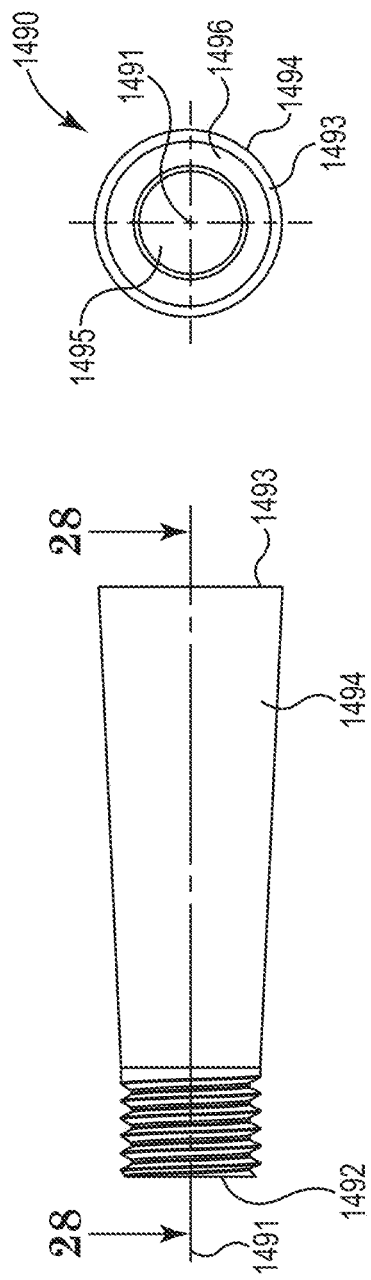

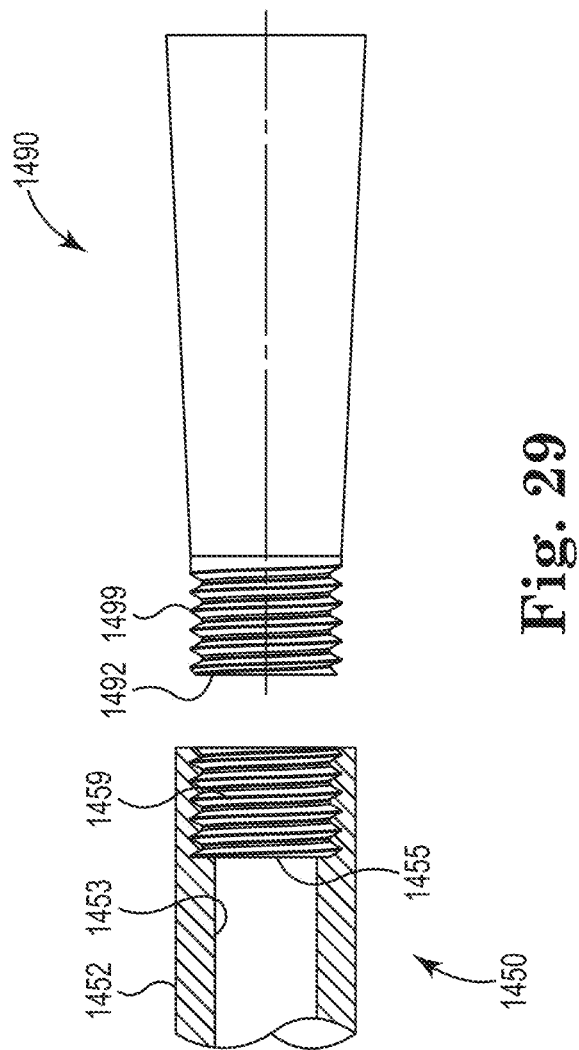

AIR FILTER SYSTEMS AND METHODS OF USING THE SAME

RELATED APPLICATIONS

This application claims the benefit under 35 U.S.C. § 119(e) of U.S. Provisional Patent Application No. 61/943,036 filed on Feb. 21, 2014 titled AIR FILTER SYSTEMS AND METHODS OF USING THE SAME; U.S. Provisional Patent Application No. 61/789,385 filed on Mar. 15, 2013 titled OVATE TUBULAR FILTER CARTRIDGES AND FILTER SYSTEMS USING THE SAME; and U.S. Provisional Patent Application No. 61/772,198 filed on Mar. 4, 2013 titled DIVERGING NOZZLES AND FILTER ELEMENT CLEANING SYSTEMS USING DIVERGING NOZZLES—each of which is hereby incorporated by reference in its entirety.

Air filter systems with pulse generators, pulse collectors and related components, along with methods of using the same are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Systems for cleaning an air or other gas stream laden with particulate matter include air filter assemblies that have filter elements disposed in a housing. The filter element may be a bag, sock or cartridge including a suitable filter media, e.g., fabric, pleated paper, etc. The gas stream contaminated with particulate matter is typically passed through the housing so that the particulate matter is captured and retained by one or more filter elements.

In a standard design of air filter system, an air filter system has a clean air chamber and a dirty air chamber. The two chambers are separated by a structure that is commonly referred to as a tube sheet. The tube sheet has a number of openings so that air can pass between the clean and dirty air chambers. The filter elements are positioned over the openings so that particulate-laden air (dirty air) introduced into the dirty air chamber must pass through a filter element to move into the clean air chamber. The particulate matter in the dirty air collects on the filter elements as the air moves through the filter elements. From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter elements capture particulate matter, flow through the system is inhibited and periodic cleaning of the filter elements can be performed to increase air flow through the system. Cleaning can be accomplished by periodically pulsing a brief jet of pressurized air into the interior of the filter element to reverse the air flow through the filter element, causing the collected particulate matter to be driven off of the filter element. The pressurized air may be directed into pulse collectors as described in, e.g. U.S. Pat. No. 3,942,962 (Duyckinck), U.S. Pat. No. 4,218,227 (Frey), U.S. Pat. No. 6,090,173 (Johnson et al.), U.S. Pat. Nos. 4,395,269, 6,902,592 (Green et al.), U.S. Pat. No. 7,641,708 (Kosmider et al.), and US Patent Application Publication US 2006/0112667 A1.

SUMMARY

The air filter systems described herein include one or more pulse collectors and pulse generators aligned along pulse axes.

In one or more embodiments, the pulse generators and filter elements attached to the pulse collectors are arranged in an air filter system as described herein along a pulse distance as measured from a pulse outlet to a filter element opening to improve efficiency of the pulse regeneration process. In particular, the pulse distances, when selected to fall within the parameters described herein may exhibit improve pulse cleaning performance.

In one or more embodiments, the pulse collectors and the filter elements used in an air filter system as described herein may have openings with a relationship between them (as described herein) that may improve efficiency of a pulse regeneration process as, e.g., a cleaning pulse moves from the pulse collector into the filter element and/or as clean air moves from the interior volume of the filter element into the pulse collector.

In one or more embodiments, the pulse collectors used in air filter systems described herein may have a relationship between their hydraulic diameter and their length that may improve efficiency of a pulse regeneration process as, e.g., a cleaning pulse moves from the pulse collector into the filter element and/or as clean air moves from the interior volume of the filter element into the pulse collector.

In one or more embodiments, the pulse collectors used in air filter systems as described herein may include a filter section and a pulse section that meet at a junction along a length of the pulse collector. In one or more embodiments, the portions of the passageways in the pulse collectors defined by the pulse sections of the pulse collectors have a hydraulic diameter that increases when moving from the junction to the tube sheet opening of the pulse section. In one or more embodiments, the portions of the passageways defined by the filter sections of the pulse collectors have a hydraulic diameter that remains constant when moving from the junction to the filter end opening of the filter section. Pulse collectors having a pulse section within an increasing hydraulic diameter and a filter section with a constant hydraulic diameter as described herein may, in one or more embodiments, improve efficiency of a pulse regeneration process.

In one or more embodiments, air filter systems using filter elements/cartridges having filter media shaped or formed into ovate cross-sections as described herein may exhibit improved particulate loading capacity because, e.g., more of the filter media faces downward than upward. The downward facing filter media may, in or more embodiments, be less susceptible to particulate loading during use than filter media facing upward. Although described as ovate or ovoidal in shape, the cross-sections of the tubular filter media in the ovate filter elements/cartridges described herein may, in one or more embodiments, have one or more flat edges, i.e., the ovate or ovoidal cross-sections may not be true ovoids including only curved lines. Rather, only portions of the cross-sectional shapes of one or more embodiments of the tubular filter elements/cartridges may be in the form of true ovoids. In one or more embodiments, the inner perimeters of the ovate cross-sections of the filter elements/cartridges used in air filter systems as described herein may be asymmetric, i.e., there may be no line about which the inner perimeters of the cross-sections of the tubular filter media in the filter elements/cartridges are symmetric. In one or more alternative embodiments, the inner perimeters of the ovate cross-sections of the tubular filter media in the filter elements/cartridges may have only one line of symmetry. That single line of symmetry may, in one or more embodiments, be described as extending through a top and a bottom of the tubular filter media. Improved particulate loading capacity in such filter elements/cartridges may offer the advantage of reduced pulse cleaning requirements in terms of, e.g., fewer pulses required, reduced pulse energy required per pulse, etc.

In one or more embodiments of the air filter systems described herein, the pulse generators may include diverging pulse guides having shapes that may, in one or more embodiments, provide improvements in the cleaning of filter elements using reverse pulses by increasing the average peak pressure as measured in the interior surfaces of the filter elements used in air filter systems as described herein.

Air filter systems that include one or more of the various features and components described herein may offer one or more advantages such as, e.g., improved energy efficiency, reduced noise generation, etc. by, in one or more embodiments, reducing pressure drops within the air filter systems both during primary flow operation and pulse cleaning of the filter elements (where primary flow operation occurs when the air filter system is removing particulate matter from a dirty air stream), reducing frictional losses in the air filter systems (both during primary flow operation and pulse cleaning of the filter elements, improving particulate loading characteristics (thus potentially requiring fewer cleaning pulses), etc.

Other potential advantages of one or more embodiments of air filter systems that include asymmetrically arranged support beams in the yokes used to support filter elements in the air filter systems may include, e.g., accurate and repeatable alignment of the filter elements in a selected rotational orientation relative to the pulse axis extending through the yoke during placement. The asymmetric yokes may also assist in retention of the rotational orientation of the filter elements during use—which, in the case of one or more embodiments of the ovate and/or asymmetric filter cartridges described herein, provide for improved use of the enhanced particulate loading capacity of the filter cartridges.

These advantages may, in one or more embodiments be synergistic, i.e., the energy efficiency, reduced noise, etc. may be improved by using two or more of the features and/or components together in the same air filter systems.

In a first aspect, one or more embodiments of the air filter systems described herein may include: a tube sheet configured to separate a housing into a dirty air chamber and a clean air chamber; a pulse collector defining a passageway that extends through the pulse collector from a filter end opening at a filter end of the pulse collector element to a tube sheet opening at a tube sheet end of the pulse collector; an aperture in the tube sheet, wherein the tube sheet end of the pulse collector is configured for attachment to the tube sheet such that the tube sheet opening of the pulse collector is aligned with the aperture such that air passing from the dirty air chamber into the clean air chamber through the aperture passes through the passageway of the pulse collector; a filter element attached to the filter end of the pulse collector such that air passing into the passageway of the pulse collector through the filter end opening of the pulse collector passes through an interior volume of the filter element before reaching the filter end opening, wherein the filter element comprises a filter element opening at a junction between the filter end of the pulse collector and the filter element; a pulse generator located in the clean air chamber and positioned to deliver pulses of air into the interior volume of the filter element, the pulses of air passing through the aperture and the passageway of the pulse collector before reaching the interior volume of the filter element, wherein the pulse generator is configured to deliver the pulses of air along a pulse axis that extends from the pulse generator through the aperture in the tube sheet, the tube sheet opening in the pulse collector, and the filter end opening in the pulse collector, wherein the pulse generator comprises a pulse outlet located on the pulse axis and through which the pulses of air are delivered along the pulse axis, the pulse outlet defined by opposing walls that do not diverge with respect to the pulse axis, and wherein the pulse outlet defines a pulse outlet hydraulic diameter; wherein a pulse distance measured along the pulse axis from the pulse outlet to the filter element opening is 30 or more times the pulse outlet hydraulic diameter.

In one or more embodiments of the first aspect of the air filter systems described herein, the pulse distance is 60 times or less the pulse outlet hydraulic diameter.

In one or more embodiments of the first aspect of the air filter systems described herein, the pulse distance is 35 or more times the pulse outlet hydraulic diameter.

In one or more embodiments of the first aspect of the air filter systems described herein, the pulse distance is 50 times or less the pulse outlet hydraulic diameter.

In one or more embodiments of the first aspect of the air filter systems described herein, a hydraulic diameter of the filter element opening is 112% or less of a hydraulic diameter of the filter end opening of the pulse collector. In one or more embodiments, the hydraulic diameter of the filter element opening is 90% or more of the hydraulic diameter of the filter end opening of the pulse collector. In one or more embodiments, the hydraulic diameter of the filter element opening is 108% or less of the hydraulic diameter of the filter end opening of the pulse collector. In one or more embodiments, the hydraulic diameter of the filter element opening is 95% or more of the hydraulic diameter of the filter end opening of the pulse collector.

In one or more embodiments of the first aspect of the air filter systems described herein, an absolute value of a difference between a hydraulic diameter of the filter element opening and a hydraulic diameter of the filter end opening of the pulse collector is within 2% or less of the hydraulic diameter of the filter element opening.

In one or more embodiments of the first aspect of the air filter systems described herein, an offset between an inner surface of the filter element opening and an inner surface of the filter end opening of the pulse collector is no more than 15 millimeters about a perimeter of the filter element opening.

In one or more embodiments of the first aspect of the air filter systems described herein, an offset between an inner surface of the filter element opening and an inner surface of the filter end opening of the pulse collector is no more than 10 millimeters about a perimeter of the filter element opening.

In one or more embodiments of the first aspect of the air filter systems described herein, an offset between an inner surface of the filter element opening and an inner surface of the filter end opening of the pulse collector is no more than 5 millimeters about a perimeter of the filter element opening.

In one or more embodiments of the first aspect of the air filter systems described herein, the pulse collector comprises a passageway length measured along the pulse axis that is equal to or greater than a hydraulic diameter of the filter end opening of the pulse collector.

In one or more embodiments of the first aspect of the air filter systems described herein, the pulse collector comprises a passageway length measured along the pulse axis that is no more than three times a hydraulic diameter of the filter end opening of the pulse collector.

In one or more embodiments of the first aspect of the air filter systems described herein, the pulse collector comprises a filter section and a pulse section, wherein the filter section and the pulse section meet at a junction located between the filter end and the tube sheet end of the pulse collector; wherein a portion of the passageway defined by the pulse section comprises a hydraulic diameter that increases when moving from the junction to the tube sheet opening; and wherein a portion of the passageway defined by the filter section comprises a hydraulic diameter that remains constant when moving from the junction to the filter end. In one or more embodiments, the filter section comprises a filter section length measured along the pulse axis from the filter end to the junction and the pulse section comprises a pulse section length measured along the pulse axis from the tube sheet end to the junction, wherein the filter section length is less than or equal to the pulse section length. In one or more embodiments, the filter section length and the pulse section length are both equal to or less than 1.5 times a hydraulic diameter of the filter end opening of the pulse collector. In one or more embodiments, the filter section length and the pulse section length are both equal to or less than a hydraulic diameter of the filter end opening of the pulse collector.

In one or more embodiments of the first aspect of the air filter systems described herein in which the pulse collector comprises a filter section and a pulse section that meet at a junction located between the filter end and the tube sheet end of the pulse collector and in which the portion of the passageway defined by the pulse section comprises a hydraulic diameter that increases when moving from the junction to the tube sheet opening, the pulse section comprises opposing walls defining the portion of the passageway in the pulse section that diverge from the pulse axis at an included angle that is greater than zero (0) degrees and less than or equal to ten (10) degrees. In one or more embodiments, the included angle is equal to or greater than three (3) degrees. In one or more embodiments, the included angle is less than or equal to eight (8) degrees. In one or more embodiments, the included angle is equal to or greater than five (5) degrees. In one or more embodiments, the included angle is less than or equal to seven (7) degrees.

In one or more embodiments of the first aspect of the air filter systems described herein in which the pulse collector comprises a filter section and a pulse section that meet at a junction located between the filter end and the tube sheet end of the pulse collector, the filter section and the pulse section comprise separate articles attached to each other at the junction. In one or more embodiments, the filter section and the pulse section are welded together at the junction.

In one or more embodiments of the first aspect of the air filter systems described herein, the pulse generator comprises a diverging pulse guide attached to the pulse outlet.

In one or more embodiments of the first aspect of the air filter systems described herein, the filter element is supported on a yoke extending away from the pulse collector along the pulse axis, wherein the yoke comprises two or more support beams aligned with the pulse axis, wherein the two or more support beams are arranged asymmetrically about the pulse axis. In one or more embodiments, the filter element opening comprises alignment features arranged to align with the two or more support beams when the filter element is in only one rotational orientation relative to the pulse axis. In one or more embodiments, the filter element comprises a distal end located away from the pulse collector, wherein a distal end opening is located at the distal end of the filter element, and wherein the distal end opening comprises alignment features arranged to align with the two or more support beams when the filter element is in only one rotational orientation relative to the pulse axis.

In one or more embodiments of the first aspect of the air filter systems described herein, the filter element is supported on a yoke extending away from the pulse collector along the pulse axis, wherein a second filter element is supported on the yoke, and wherein the filter element is located between the pulse collector and the second filter element. In one or more embodiments, the yoke comprises two or more support beams aligned with the pulse axis, wherein the two or more support beams are arranged asymmetrically about the pulse axis. In one or more embodiments, the filter element opening comprises alignment features arranged to align with the two or more support beams when the filter element is in only one rotational orientation relative to the pulse axis, and wherein the second filter element comprises a second filter element opening that comprises alignment features arranged to align with the two or more support beams when the second filter element is in only one rotational orientation relative to the pulse axis. In one or more embodiments, the filter element comprises a distal end located away from the pulse collector, wherein a distal end opening is located at the distal end of the filter element, and wherein the distal end opening comprises alignment features arranged to align with the two or more support beams when the filter element is in only one rotational orientation relative to the pulse axis; and wherein the second filter element comprises a distal end located away from the pulse collector, wherein a distal end opening is located at the distal end of the second filter element, and wherein the distal end opening of the second filter element comprises alignment features arranged to align with the two or more support beams when the second filter element is in only one rotational orientation relative to the pulse axis.

In one or more embodiments of the first aspect of the air filter systems described herein, the filter element comprises: tubular filter media defining an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; and wherein the bottom axis intersection point does not bisect the maximum height of the cross-section as measured between the top and bottom points.

In one or more embodiments of the first aspect of the air filter systems including a filter element including tubular filter media as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point. In one or more embodiments, the bottom section height is greater than zero. In one or more embodiments, the bottom section height is greater than or equal to 0.1 of the maximum height.

In one or more embodiments of the first aspect of the air filter systems including a filter element including tubular filter media as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length. In one or more embodiments, the bottom perimeter section length is 1.2 or more times greater than the top perimeter section length. In one or more embodiments, the bottom perimeter section length is 2 or more times greater than the top perimeter section length.

In one or more embodiments of the first aspect of the air filter systems including a filter element including tubular filter media as described herein, the inner perimeter of the cross-section comprises a bottom perimeter section containing the bottom point and extending from the first point to the second point, wherein the entire bottom perimeter section is continuously curved from the first point to the second point.

In one or more embodiments of the first aspect of the air filter systems including a filter element including tubular filter media as described herein, no section of the inner perimeter between the first point and the second point lies on a straight line for a distance of more than 1 centimeter.

In one or more embodiments of the first aspect of the air filter systems including a filter element including tubular filter media as described herein, the axis of maximum height does not lie on a line of symmetry of the inner perimeter of the cross-section.

In one or more embodiments of the first aspect of the air filter systems including a filter element including tubular filter media as described herein, the inner perimeter of the cross-section defines only one line of symmetry.

In one or more embodiments of the first aspect of the air filter systems including a filter element including tubular filter media as described herein, the inner perimeter of the cross-section defines only one line of symmetry, and wherein the axis of maximum height is coincident with the line of symmetry.

In one or more embodiments of the first aspect of the air filter systems including a filter element including tubular filter media as described herein, the inner perimeter of the cross-section is asymmetric.

In one or more embodiments of the first aspect of the air filter systems including a filter element including tubular filter media as described herein, the tube axis is aligned with the pulse axis.

In one or more embodiments of the first aspect of the air filter systems including a filter element including tubular filter media as described herein, the tube axis is collinear with the pulse axis.

In one or more embodiments of the first aspect of the air filter systems including a filter element including tubular filter media as described herein, the tubular filter media defines an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter having an ovate shape; wherein the ovate shape of the inner perimeter of the cross-section is asymmetric.

In one or more embodiments of the first aspect of the air filter systems including a filter element including tubular filter media defining a cross-section with an inner perimeter having an asymmetric ovate shape as described herein, the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; and wherein the bottom axis intersection point does not bisect the maximum height of the cross-section as measured between the top and bottom points.

In one or more embodiments of the first aspect of the air filter systems including a filter element including tubular filter media defining a cross-section with an inner perimeter having an asymmetric ovate shape as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point. In one or more embodiments, the bottom section height is greater than zero. In one or more embodiments, the bottom section height is greater than or equal to 0.1 of the maximum height.

In one or more embodiments of the first aspect of the air filter systems including a filter element including tubular filter media defining a cross-section with an inner perimeter having an asymmetric ovate shape as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length. In one or more embodiments, the bottom perimeter section length is 1.2 or more times greater than the top perimeter section length. In one or more embodiments, the bottom perimeter section length is 2 or more times greater than the top perimeter section length.

In one or more embodiments of the first aspect of the air filter systems including a filter element including tubular filter media defining a cross-section with an inner perimeter having an asymmetric ovate shape as described herein, the inner perimeter of the cross-section comprises a bottom perimeter section containing the bottom point and extending from the first point to the second point, wherein the entire bottom perimeter section is continuously curved from the first point to the second point.

In one or more embodiments of the first aspect of the air filter systems including a filter element including tubular filter media defining a cross-section with an inner perimeter having an asymmetric ovate shape as described herein, no section of the inner perimeter between the first point and the second point lies on a straight line for a distance of more than 1 centimeter.

In one or more embodiments of the first aspect of the air filter systems including a filter element including tubular filter media defining a cross-section with an inner perimeter having an asymmetric ovate shape as described herein, the tube axis is aligned with the pulse axis.

In one or more embodiments of the first aspect of the air filter systems including a filter element including tubular filter media defining a cross-section with an inner perimeter having an asymmetric ovate shape as described herein, the tube axis is collinear with the pulse axis.

In one or more embodiments of the first aspect of the air filter systems including a filter element as described herein, the filter element includes tubular filter media defining an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; wherein the cross-section comprises a bottom section height measured along the axis of maximum height from the bottom point to the bottom axis intersection point; wherein the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length.

In one or more embodiments of the first aspect of the air filter systems including a filter element as described herein, the bottom perimeter section length is 1.2 or more times greater than the top perimeter section length.

In one or more embodiments of the first aspect of the air filter systems including a filter element as described herein, the bottom perimeter section length is 2 or more times greater than the top perimeter section length.

In one or more embodiments of the first aspect of the air filter systems including a filter element as described herein, the bottom section height is greater than zero.

In one or more embodiments of the first aspect of the air filter systems including a filter element as described herein, the bottom section height is greater than or equal to 0.1 of the maximum height.

In one or more embodiments of the first aspect of the air filter systems including a filter element as described herein, the bottom section height is less than or equal to 0.4 of the maximum height measured along the axis of maximum height from the top point to the bottom point.

In one or more embodiments of the first aspect of the air filter systems including a filter element as described herein, the inner perimeter of the cross-section comprises a bottom perimeter section containing the bottom point and extending from the first point to the second point, wherein the entire bottom perimeter section is continuously curved from the first point to the second point.

In one or more embodiments of the first aspect of the air filter systems including a filter element as described herein, no section of the inner perimeter between the first point and the second point lies on a straight line for a distance of more than 1 centimeter.

In one or more embodiments of the first aspect of the air filter systems including a filter element as described herein, the axis of maximum height does not lie on a line of symmetry of the inner perimeter of the cross-section.

In one or more embodiments of the first aspect of the air filter systems including a filter element as described herein, the inner perimeter of the cross-section defines only one line of symmetry.

In one or more embodiments of the first aspect of the air filter systems including a filter element as described herein, the inner perimeter of the cross-section defines only one line of symmetry, and wherein the axis of maximum height is coincident with the line of symmetry.

In one or more embodiments of the first aspect of the air filter systems including a filter element as described herein, the inner perimeter of the cross-section is asymmetric.

In one or more embodiments of the first aspect of the air filter systems including a filter element as described herein, the tube axis is aligned with the pulse axis.

In one or more embodiments of the first aspect of the air filter systems including a filter element as described herein, the tube axis is collinear with the pulse axis.

In one or more embodiments of the first aspect of the air filter systems including a filter element as described herein, an inscribed circle located within the inner perimeter of the cross-section occupies less than all and 60% or more of an inner area defined by the inner perimeter. In one or more embodiments, the inscribed circle located within the inner perimeter of the cross-section occupies 70% or more of the inner area defined by the inner perimeter. In one or more embodiments, the inscribed circle located within the inner perimeter of the cross-section occupies 80% or more of the inner area defined by the inner perimeter.

In one or more embodiments of the first aspect of the air filter systems including a filter element as described herein, an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle. In one or more embodiments, the maximum radial gap is 0.25 or less of the diameter of the inscribed circle.

In a second aspect, one or more embodiments of an air filter system as described herein may include: a tube sheet configured to separate a housing into a dirty air chamber and a clean air chamber; a pulse collector defining a passageway that extends through the pulse collector from a filter end opening at a filter end of the pulse collector element to a tube sheet opening at a tube sheet end of the pulse collector; an aperture in the tube sheet, wherein the tube sheet end of the pulse collector is configured for attachment to the tube sheet such that the tube sheet opening of the pulse collector is aligned with the aperture such that air passing from the dirty air chamber into the clean air chamber through the aperture passes through the passageway of the pulse collector; a pulse generator located in the clean air chamber and positioned to deliver pulses of air along a pulse axis that extends from the pulse generator through the aperture in the tube sheet, the tube sheet opening in the pulse collector, and the filter end opening in the pulse collector; a filter element attached to the filter end of the pulse collector such that air passing into the passageway of the pulse collector through the filter end opening of the pulse collector passes through an interior volume of the filter element before reaching the filter end opening. In air filter systems of the second aspect, the filter element comprises: tubular filter media defining an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; and wherein the bottom axis intersection point does not bisect the maximum height of the cross-section as measured between the top and bottom points.

In one or more embodiments of air filter systems according to the second aspect as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point.

In one or more embodiments of air filter systems including a filter element having tubular filter media according to the second aspect as described herein, the bottom section height is greater than zero.

In one or more embodiments of air filter systems including a filter element having tubular filter media according to the second aspect as described herein, the bottom section height is greater than or equal to 0.1 of the maximum height.

In one or more embodiments of air filter systems including a filter element having tubular filter media according to the second aspect as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length.

In one or more embodiments of air filter systems including a filter element having tubular filter media according to the second aspect as described herein, the bottom perimeter section length is 1.2 or more times greater than the top perimeter section length.

In one or more embodiments of air filter systems including a filter element having tubular filter media according to the second aspect as described herein, the bottom perimeter section length is 2 or more times greater than the top perimeter section length.

In one or more embodiments of air filter systems including a filter element having tubular filter media according to the second aspect as described herein, the inner perimeter of the cross-section comprises a bottom perimeter section containing the bottom point and extending from the first point to the second point, wherein the entire bottom perimeter section is continuously curved from the first point to the second point.

In one or more embodiments of air filter systems including a filter element having tubular filter media according to the second aspect as described herein, no section of the inner perimeter between the first point and the second point lies on a straight line for a distance of more than 1 centimeter.

In one or more embodiments of air filter systems including a filter element having tubular filter media according to the second aspect as described herein, the axis of maximum height does not lie on a line of symmetry of the inner perimeter of the cross-section.

In one or more embodiments of air filter systems including a filter element having tubular filter media according to the second aspect as described herein, the inner perimeter of the cross-section defines only one line of symmetry.

In one or more embodiments of air filter systems including a filter element having tubular filter media according to the second aspect as described herein, the inner perimeter of the cross-section defines only one line of symmetry, and wherein the axis of maximum height is coincident with the line of symmetry.

In one or more embodiments of air filter systems including a filter element having tubular filter media according to the second aspect as described herein, the inner perimeter of the cross-section is asymmetric.

In one or more embodiments of air filter systems including a filter element having tubular filter media according to the second aspect as described herein, the tube axis is aligned with the pulse axis.

In one or more embodiments of air filter systems including a filter element having tubular filter media according to the second aspect as described herein, the tube axis is collinear with the pulse axis.

In a third aspect, one or more embodiments of an air filter system as described herein may include: a tube sheet configured to separate a housing into a dirty air chamber and a clean air chamber; a pulse collector defining a passageway that extends through the pulse collector from a filter end opening at a filter end of the pulse collector element to a tube sheet opening at a tube sheet end of the pulse collector; an aperture in the tube sheet, wherein the tube sheet end of the pulse collector is configured for attachment to the tube sheet such that the tube sheet opening of the pulse collector is aligned with the aperture such that air passing from the dirty air chamber into the clean air chamber through the aperture passes through the passageway of the pulse collector; a pulse generator located in the clean air chamber and positioned to deliver pulses of air along a pulse axis that extends from the pulse generator through the aperture in the tube sheet, the tube sheet opening in the pulse collector, and the filter end opening in the pulse collector; a filter element attached to the filter end of the pulse collector such that air passing into the passageway of the pulse collector through the filter end opening of the pulse collector passes through an interior volume of the filter element before reaching the filter end opening. The third aspect of air filter systems as described herein include a filter element comprising tubular filter media defining an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter having an ovate shape; wherein the ovate shape of the inner perimeter of the cross-section is asymmetric.

In one or more embodiments of air filter systems including a filter element having tubular filter media according to the third aspect as described herein, the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; and wherein the bottom axis intersection point does not bisect the maximum height of the cross-section as measured between the top and bottom points.

In one or more embodiments of air filter systems including a filter element having tubular filter media according to the third aspect as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point.

In one or more embodiments of air filter systems including a filter element having tubular filter media according to the third aspect as described herein, the bottom section height is greater than zero.

In one or more embodiments of air filter systems including a filter element having tubular filter media according to the third aspect as described herein, the bottom section height is greater than or equal to 0.1 of the maximum height.

In one or more embodiments of air filter systems including a filter element having tubular filter media according to the third aspect as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length.

In one or more embodiments of air filter systems including a filter element having tubular filter media according to the third aspect as described herein, the bottom perimeter section length is 1.2 or more times greater than the top perimeter section length.

In one or more embodiments of air filter systems including a filter element having tubular filter media according to the third aspect as described herein, the bottom perimeter section length is 2 or more times greater than the top perimeter section length.

In one or more embodiments of air filter systems including a filter element having tubular filter media according to the third aspect as described herein, the inner perimeter of the cross-section comprises a bottom perimeter section containing the bottom point and extending from the first point to the second point, wherein the entire bottom perimeter section is continuously curved from the first point to the second point.

In one or more embodiments of air filter systems including a filter element having tubular filter media according to the third aspect as described herein, no section of the inner perimeter between the first point and the second point lies on a straight line for a distance of more than 1 centimeter.

In one or more embodiments of air filter systems including a filter element having tubular filter media according to the third aspect as described herein, the tube axis is aligned with the pulse axis.

In one or more embodiments of air filter systems including a filter element having tubular filter media according to the third aspect as described herein, the tube axis is collinear with the pulse axis.

In a fourth aspect, one or more embodiments of an air filter system as described herein may include: a tube sheet configured to separate a housing into a dirty air chamber and a clean air chamber; a pulse collector defining a passageway that extends through the pulse collector from a filter end opening at a filter end of the pulse collector element to a tube sheet opening at a tube sheet end of the pulse collector; an aperture in the tube sheet, wherein the tube sheet end of the pulse collector is configured for attachment to the tube sheet such that the tube sheet opening of the pulse collector is aligned with the aperture such that air passing from the dirty air chamber into the clean air chamber through the aperture passes through the passageway of the pulse collector; a pulse generator located in the clean air chamber and positioned to deliver pulses of air along a pulse axis that extends from the pulse generator through the aperture in the tube sheet, the tube sheet opening in the pulse collector, and the filter end opening in the pulse collector; and a filter element attached to the filter end of the pulse collector such that air passing into the passageway of the pulse collector through the filter end opening of the pulse collector passes through an interior volume of the filter element before reaching the filter end opening. The fourth aspect of air filter systems as described herein include a filter element comprising tubular filter media defining an interior surface facing an interior volume of the filter element and an exterior surface facing away from the interior volume, wherein the tubular filter media defines a tubular filter media length measured along a tube axis extending from a first end to a second end of the tubular filter media; a filter element housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height measured between a top point and a bottom point, wherein the top point and the bottom point are located on the inner perimeter and an axis of maximum height (Hmax) that extends across the cross-section at a location and in an orientation such that the top point and the bottom point are points on the inner perimeter that are furthest apart from each other along any straight line extending across the cross-section; wherein the cross-section comprises a maximum width measured between a first point and a second point located on the inner perimeter and on an axis of maximum width (Wmax), wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; wherein the cross-section comprises a bottom section height measured along the axis of maximum height from the bottom point to the bottom axis intersection point; wherein the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length.

In one or more embodiments of air filter systems including a filter element having tubular filter media according to the fourth aspect as described herein, the bottom perimeter section length is 1.2 or more times greater than the top perimeter section length.

In one or more embodiments of air filter systems including a filter element having tubular filter media according to the fourth aspect as described herein, the bottom perimeter section length is 2 or more times greater than the top perimeter section length.

In one or more embodiments of air filter systems including a filter element having tubular filter media according to the fourth aspect as described herein, the bottom section height is greater than zero.

In one or more embodiments of air filter systems including a filter element having tubular filter media according to the fourth aspect as described herein, the bottom section height is greater than or equal to 0.1 of the maximum height.

In one or more embodiments of air filter systems including a filter element having tubular filter media according to the fourth aspect as described herein, the bottom section height is less than or equal to 0.4 of the maximum height measured along the axis of maximum height from the top point to the bottom point.

In one or more embodiments of air filter systems including a filter element having tubular filter media according to the fourth aspect as described herein, the inner perimeter of the cross-section comprises a bottom perimeter section containing the bottom point and extending from the first point to the second point, wherein the entire bottom perimeter section is continuously curved from the first point to the second point.

In one or more embodiments of air filter systems including a filter element having tubular filter media according to the fourth aspect as described herein, no section of the inner perimeter between the first point and the second point lies on a straight line for a distance of more than 1 centimeter.

In one or more embodiments of air filter systems including a filter element having tubular filter media according to the fourth aspect as described herein, the axis of maximum height does not lie on a line of symmetry of the inner perimeter of the cross-section.

In one or more embodiments of air filter systems including a filter element having tubular filter media according to the fourth aspect as described herein, the inner perimeter of the cross-section defines only one line of symmetry.

In one or more embodiments of air filter systems including a filter element having tubular filter media according to the fourth aspect as described herein, the inner perimeter of the cross-section defines only one line of symmetry, and wherein the axis of maximum height is coincident with the line of symmetry.

In one or more embodiments of air filter systems including a filter element having tubular filter media according to the fourth aspect as described herein, the inner perimeter of the cross-section is asymmetric.

In one or more embodiments of air filter systems including a filter element having tubular filter media according to the fourth aspect as described herein, the tube axis is aligned with the pulse axis.

In one or more embodiments of air filter systems including a filter element having tubular filter media according to the fourth aspect as described herein, the tube axis is collinear with the pulse axis.

In one or more embodiments of air filter systems including a filter element having tubular filter media according to the second, third, or fourth aspect as described herein, an inscribed circle located within the inner perimeter of the cross-section occupies less than all and 60% or more of an inner area defined by the inner perimeter. In one or more embodiments, the inscribed circle located within the inner perimeter of the cross-section occupies 70% or more of the inner area defined by the inner perimeter. In one or more embodiments, the inscribed circle located within the inner perimeter of the cross-section occupies 80% or more of the inner area defined by the inner perimeter.

In one or more embodiments of air filter systems including a filter element having tubular filter media according to the second, third, or fourth aspect as described herein, an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle. In one or more embodiments, the maximum radial gap is 0.25 or less of the diameter of the inscribed circle.

In one or more embodiments of air filter systems including a filter element having tubular filter media according to the first, second, third, or fourth aspect as described herein, the cross-section is taken transverse to the tube axis at any location along 10% or more, optionally 25% or more, and optionally 50% or more of the tubular filter media length.

In one or more embodiments of air filter systems according to the first, second, third, or fourth aspect as described herein, a diverging pulse guide is operably connected to the pulse generator, wherein the pulses of air from the pulse generator pass through the diverging pulse guide, and wherein the diverging pulse guide comprises: a tubular wall comprising a connector end connected to the pulse generator and an open end located distal from the connector end; an interior channel extending through the diverging pulse guide from the connector end to the open end, wherein the interior channel defines a channel length extending from the connector end to the open end and a channel width defined by opposing interior surfaces of the tubular wall, wherein the channel length extends along a longitudinal axis and wherein the channel width extends transverse to the longitudinal axis; wherein the interior channel comprises a first section proximate the connector end and a second section proximate the open end such that the first section is located between the second section and the connector end and the second section is located between the first section and the open end; wherein the opposing interior surfaces of the diverging pulse guide in the first section diverge from the longitudinal axis at a first angle, wherein the first angle is greater than zero (0) degrees; wherein the opposing interior surfaces of the diverging pulse guide in the second section diverge from the longitudinal axis at a second angle that is greater than the first angle.

In one or more embodiments of a diverging pulse guide used in an air filter system as described herein, the second section of the interior channel comprises a second section length measured along the longitudinal axis that greater than the channel width at the connector end.

In one or more embodiments of a diverging pulse guide used in an air filter system as described herein, the second section of the interior channel comprises a second section length measured along the longitudinal axis that is two (2) or more times the channel width at the connector end.

In one or more embodiments of a diverging pulse guide used in an air filter system as described herein, the second angle is 1.5 or more times as large as the first angle.

In one or more embodiments of a diverging pulse guide used in an air filter system as described herein, the first angle is three (3) degrees or less.

In one or more embodiments of a diverging pulse guide used in an air filter system as described herein, the second angle is three (3) degrees or more.

In one or more embodiments of a diverging pulse guide used in an air filter system as described herein, the second angle is four (4) degrees or more.

In one or more embodiments of a diverging pulse guide used in an air filter system as described herein, the second angle is five (5) degrees or more.

In one or more embodiments of a diverging pulse guide used in an air filter system as described herein, the second angle is nine (9) degrees or less.

In one or more embodiments of a diverging pulse guide used in an air filter system as described herein, the second angle is eight (8) degrees or less.

In one or more embodiments of a diverging pulse guide used in an air filter system as described herein, the second angle is seven (7) degrees or less.

In one or more embodiments of a diverging pulse guide used in an air filter system as described herein, the second angle is six (6) degrees.

In one or more embodiments of a diverging pulse guide used in an air filter system as described herein, the interior channel comprises a circular cross-section taken transverse to the longitudinal axis at any point along the longitudinal axis.

In one or more embodiments of a diverging pulse guide used in an air filter system as described herein, at least a portion of an exterior surface of the tubular wall comprises threads extending from the connector end towards the open end.

In a fifth aspect, one or more embodiments of a method of cleaning one or more filter elements in an air filter system as described herein may include: collecting particulate matter on a filter element located in a dirty air chamber; and directing a pulse of air into the interior volume of the filter element from a pulse generator located in the clean air chamber at a selected time after collecting the particulate matter on the filter element.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the air filter systems and methods described herein. Rather, a more complete understanding of the invention will become apparent and appreciated by reference to the following Description of Illustrative Embodiments and claims in view of the accompanying figures of the drawing.

BRIEF DESCRIPTIONS OF THE VIEWS OF THE DRAWING

FIG. 26 is a side elevational view of one illustrative embodiment of a diverging pulse guide as described herein.

FIG. 27 is an end view of the diverging pulse guide of FIG. 26.

FIG. 28 is a cross-sectional view of the diverging pulse guide of FIG. 26 taken along line 28-28 in FIG. 26.

FIG. 29 is a partial cross-sectional view depicting one illustrative embodiment of a connection between a diverging pulse guide and a pulse generator as described herein.

DESCRIPTION OF ILLUSTRATIVE EMBODIMENTS

Figure 1:
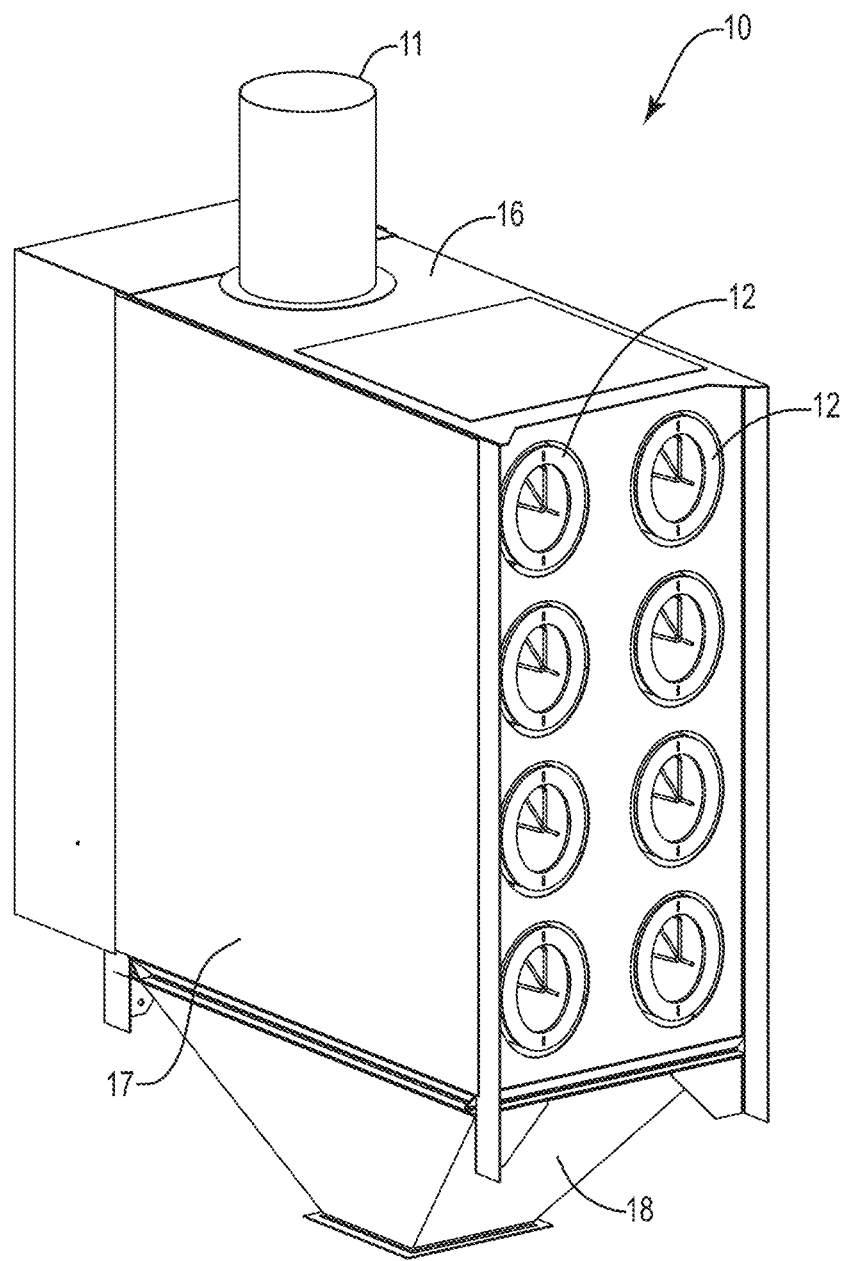
FIG. 1 is a perspective view of one illustrative embodiment of an air filter system as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Referring to FIGS. 1-4, one illustrative embodiment of an air filter system is depicted generally at 10. The air filter system depicted in FIG. 1 is generally in the shape of a box and includes an upper wall panel 16, and two pairs of opposite side wall panels 17 (one of which is depicted in FIG. 1). The air filter system 10 includes a dirty air conduit 11 for receiving dirty or contaminated air (i.e., air with particulate matter therein) into the filter system 10. A clean air conduit 13 (see, e.g., FIGS. 3 and 4) may be provided for venting clean or filtered air from the filter system 10. The air filter system 10 includes access openings 12 for multiple filter elements (not shown in FIG. 1) configured together in a side-by-side arrangement. In use, each of the access openings 12 is sealed by a cover (not shown) such that dirty air entering the air filter system 10 does not escape through the access openings 12.

The air filter system may also include a hopper 18 to collect particulate matter separated from the dirty air stream as described herein. The hopper 18 may include sloped walls to facilitate collection of the particulate matter and may, in some embodiments, include a driven auger or other mechanism for removing the collected particulate matter.

Figure 2:
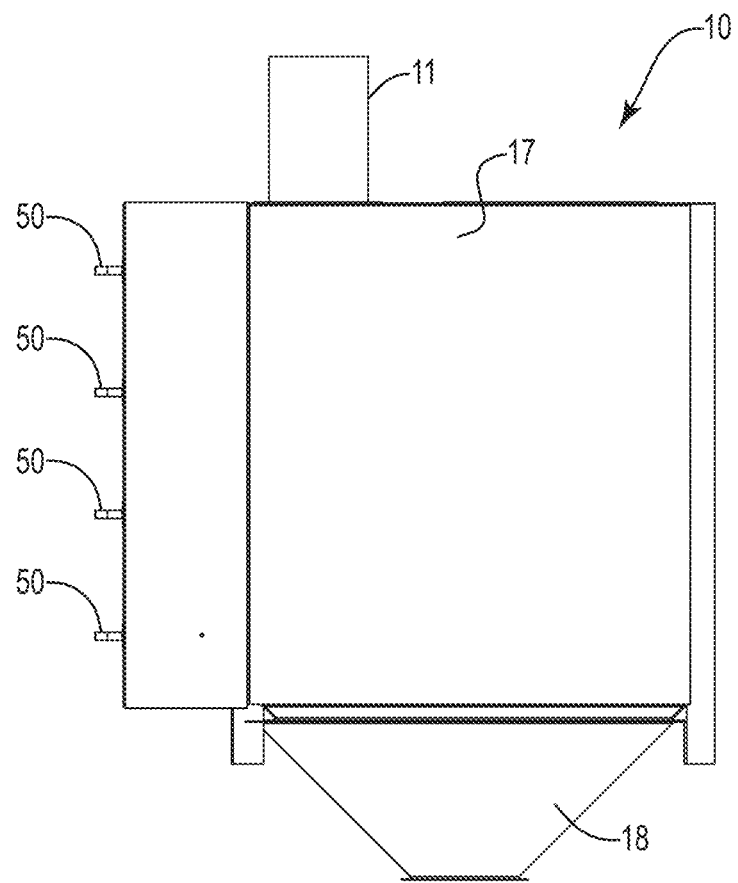
FIG. 2 is a side view of the air filter system depicted in FIG. 1.
Figure 3:
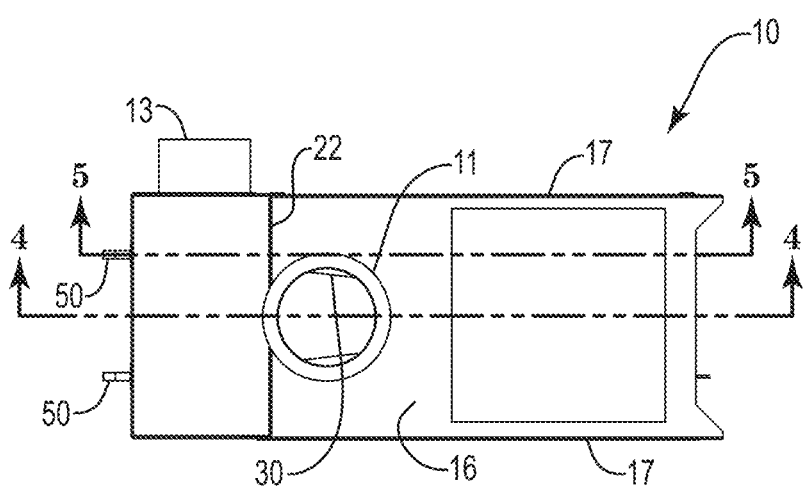
FIG. 3 is a top view of the air filter system depicted in FIGS. 1 and 2.

The air filter system of FIG. 1 is depicted in a side elevation in FIG. 2 and a top plan view in FIG. 3. The air filter system 10, as seen in FIGS. 2 and 3, includes pulse generators 50 as part of a pulse-jet cleaning system, with the pulse generators 50 configured to direct a pulse of air into the filter elements as described herein.

Figure 4:
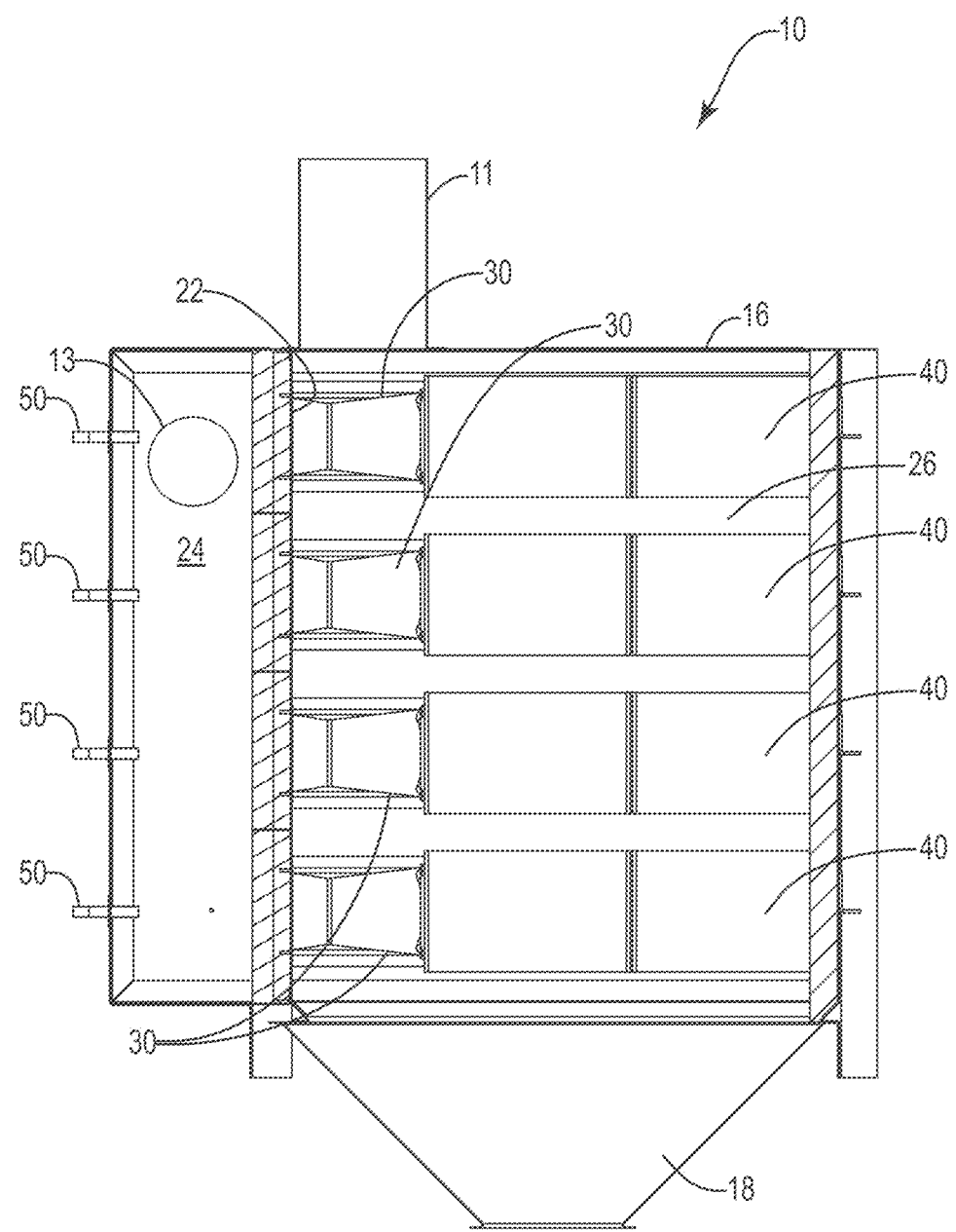
FIG. 4 is a cross-sectional view of the air filter system of FIGS. 1-3 taken along line 4-4 in FIG. 3.

FIG. 4 is a cross-sectional view of the air filter system 10 taken along line 4-4 in FIG. 3 and shows the interior of the air filter system 10. The interior of the air filter system includes a tube sheet 22 that separates the interior of the housing into a clean air chamber 24 and a dirty air chamber 26. As depicted in FIGS. 3 and 4, the air filter system 10 includes a clean air conduit 13 through which clean air exits from the clean air chamber during operation of the air filter system 10.

Figure 5:
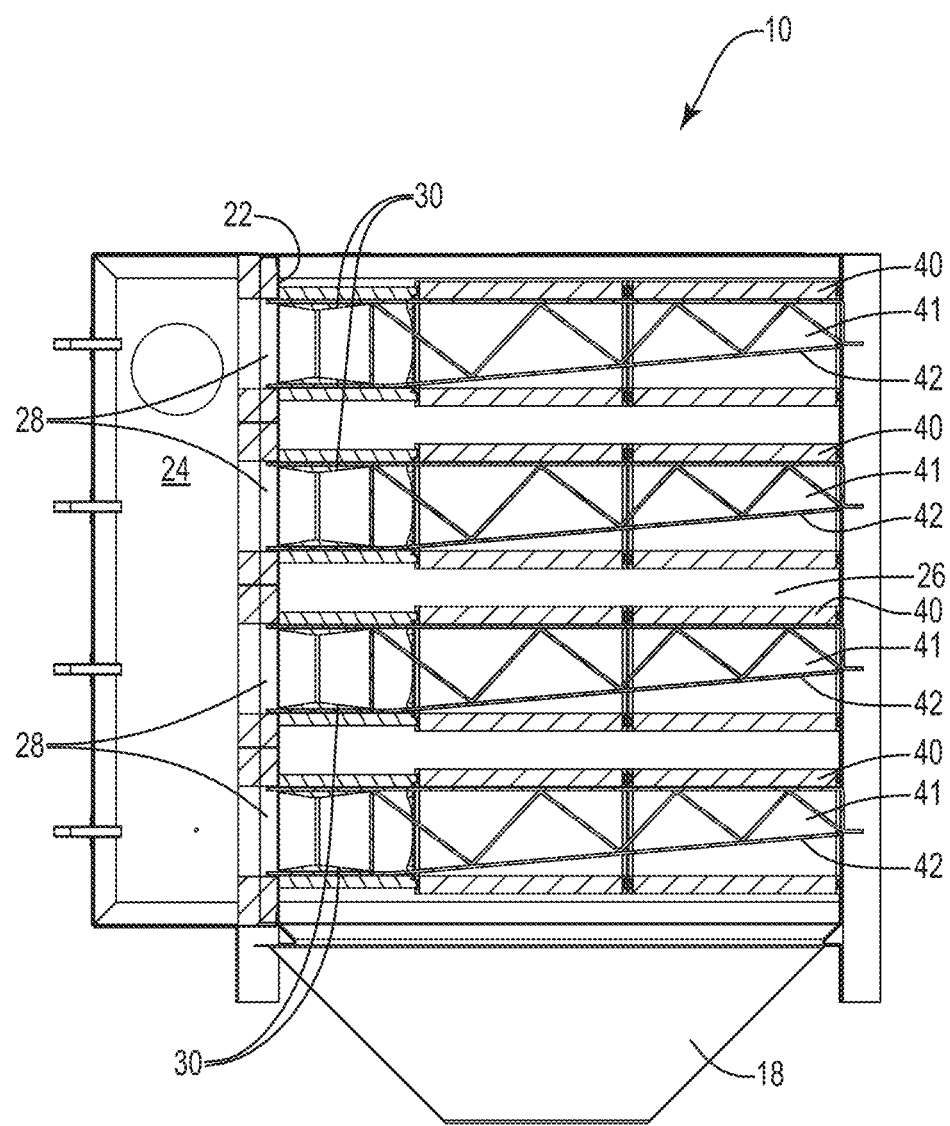
FIG. 5 is a cross-sectional view of the air filter system of FIGS. 1-3 taken along line 5-5 in FIG. 3.
Figure 6:
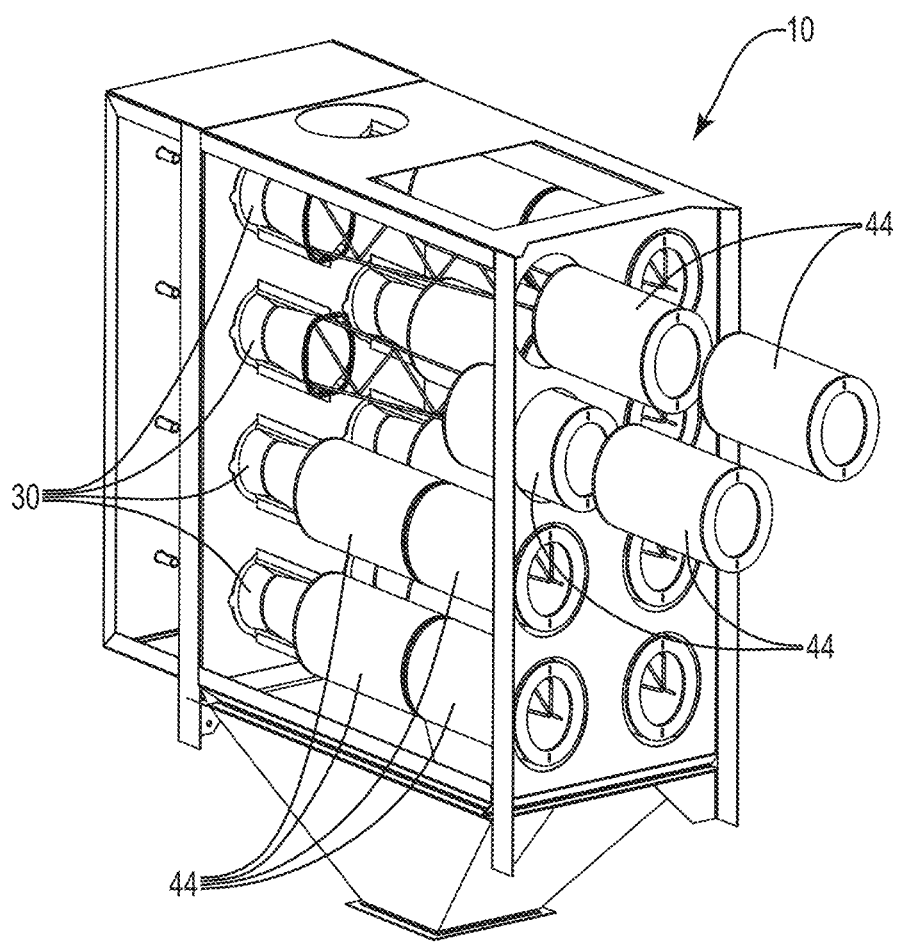
FIG. 6 is partially exploded perspective view of the air filter system of FIGS. 1-5.

The depicted air filter system 10 includes pulse collectors 30 and filter elements 40 in the dirty air chamber 26. The pulse collectors 30 are attached to the tube sheet 22 over an aperture in the tube sheet 22 (not seen in FIG. 4) such that a pulse of air from the pulse generators 50 passing through the pulse collector 30 enters an interior volume 41 of the filter elements 40. FIGS. 5 and 6 are, respectively, a cross-sectional view of the air filter system of FIGS. 1-4 taken along line 5-5 in FIG. 3 and a partially exploded perspective view of the air filter system 10 with some of the walls removed to reveal the pulse collectors 30 and filter elements 40 located therein.

The apertures 28 in the tube sheet 22 over which the pulse collectors 30 are positioned are seen in the cross-sectional view of FIG. 5. Also seen in FIG. 5 are yokes 42 attached to the pulse collectors 30 and/or the tube sheet 22. The yokes 42 are provided to assist in supporting the filter elements 40 within the housing of the air filter system 10. The use of yokes 42 and similar structures for supporting filter elements in an air filter system may be described in, e.g., U.S. Pat. No. 3,942,962 (Duyckinck), U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), and U.S. Pat. No. 7,641,708 (Kosmider et al.).

Although the filter elements 40 depicted in FIGS. 4-6 are in the form of two-part cartridges, the air filter systems described herein can be adapted to use a variety of filter elements provided the filter elements can be used in conjunction with pulse collectors. In one or more embodiments, the filter elements may take the form of, e.g., bags, socks, cartridges, etc. In one or more embodiments of the air filter systems described herein, the filter elements may, for example, include only a single cartridge. In one or more embodiments of the air filter systems described herein that include a filter element with two or more components (e.g., cartridges, bags, socks, etc.), two or more of the components may be the same or different form, size, shape, etc.

The pulse generators 50 of the air filter system 10 are configured to direct air into the pulse collectors 30 through the apertures 28 in the tube sheet 22. The air from each of the pulse generators 50 enters the pulse collector 30 aligned with the pulse generator 50 and passes into the interior volume 41 of the filter element 40 to remove particulate matter from the filter elements 40 in a manner similar to that described in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), U.S. Pat. No. 8,075,648 (Raether), and US Patent Application Publication No. US2013/0305926 A1 (Raether).

The pulse generators 50 may be provided as part of a pulse-jet cleaning system including one or more sources of pressurized gas (e.g., air), valves and a control system. Illustrative embodiments of potentially suitable pulse-jet cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

Figure 7:
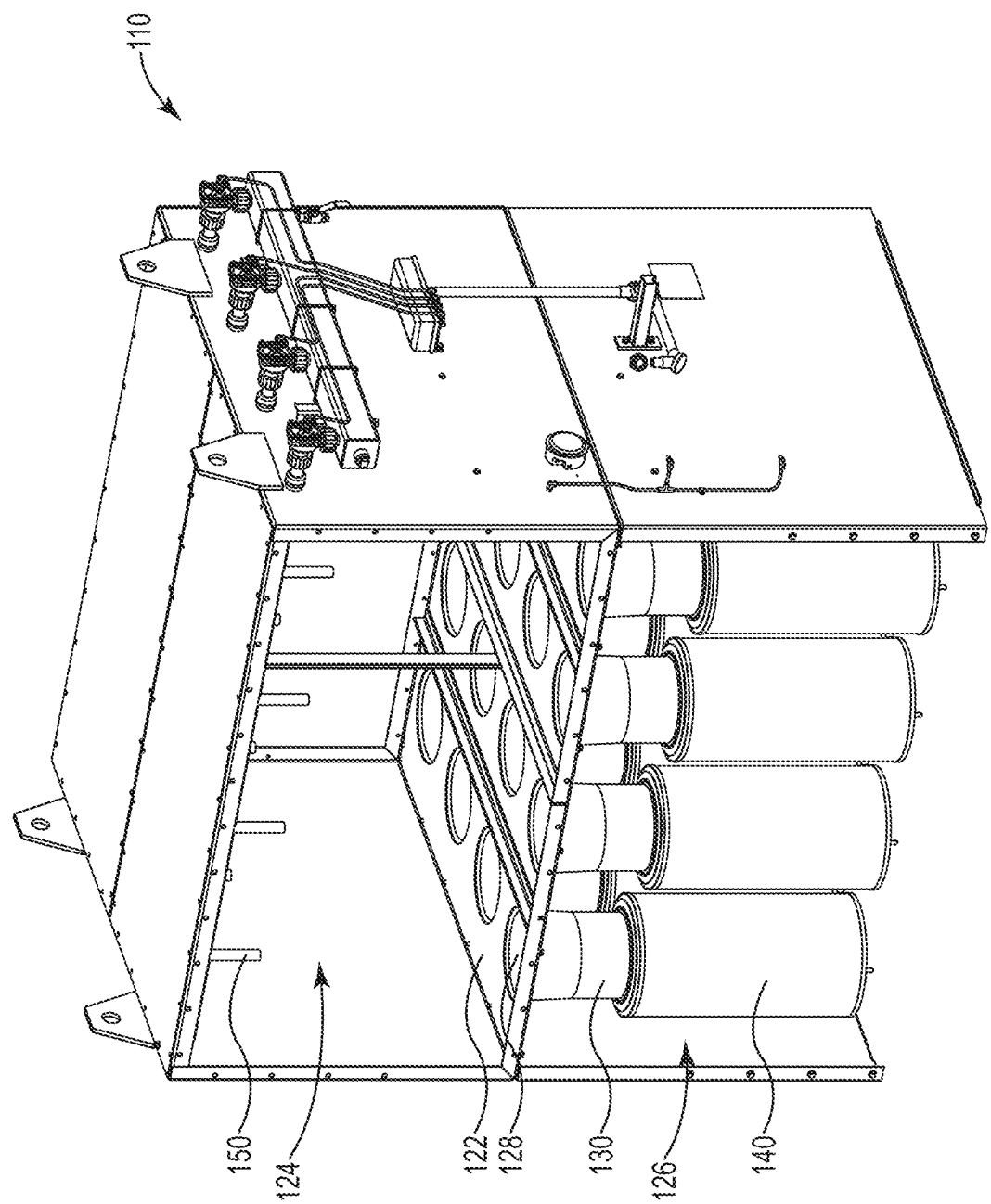
FIG. 7 is a perspective view of an alternative illustrative embodiment of an air filter system as described herein.

FIG. 7 depicts an illustrative embodiment of another air filter system 110. The air filter system 110 is also generally in the shape of a box, but differs from the air filter system depicted in FIGS. 1-6 because of the orientation of the components located within the air filter system. In particular, the air filter system 110 includes a tube sheet 122 that may, in one or more embodiments, be oriented generally horizontally with a clean air chamber 124 located above the tube sheet 122 and a dirty air chamber 126 located below the tube sheet 122. Although the air filter systems depicted in, e.g., FIGS. 6 and 7, include filter elements/cartridges in two different orientations (i.e., horizontal and vertical), air filter systems as described herein may include filter elements/cartridges in any orientation and/or arrangement.

The air filter system 110 also includes filter elements 140 attached to the tube sheet 122 through pulse collectors 130. Dirty air entering the dirty air chamber 126 passes through the filter elements 140 and the pulse collectors 130 before entering the clean air chamber 124 above the tube sheet 122. The tube sheet 122 includes apertures 128 over which the pulse collectors 130 are attached such that air passing from the pulse collectors 130 passes through the apertures 128 in the tube sheet 122 when moving from the pulse collectors 130 into the clean air chamber 124.

The air filter system 110 also includes pulse generators 150 located in the clean air chamber 124 and are configured to direct pulses into the pulse collectors 130 through the apertures 128 in the tube sheet 122. The pulse from each of the pulse generators 150 enters the pulse collector 130 over which the pulse generator is aligned and passes into the interior volume of the filter element 140 to remove particulate matter from that filter element as described herein.

In one or more embodiments of the air filter systems described herein, the distance between the pulse generators and filter elements may be selected to improve the cleaning or removal of particulate matter from the filter elements during use of the air filter systems. Referring to, e.g., FIG. 8, one illustrative embodiment of an arrangement between a pulse generator 250, tube sheet 222, pulse collector 230, and filter element 240 is depicted in the form of a simplified structure to more clearly illustrate and describe this feature.

In particular, the pulse collector 230 includes a filter end opening 231 at the end of the pulse collector element to which the filter 240 is attached. The filter element 240 includes a filter element opening 245 at the interface between the filter end opening 231 of the pulse collector 230 and the filter element 240. At the opposite end of the pulse collector 230, a tube sheet opening 232 is, in one or more embodiments, aligned with an aperture 228 in the tube sheet 222.

Figure 8:
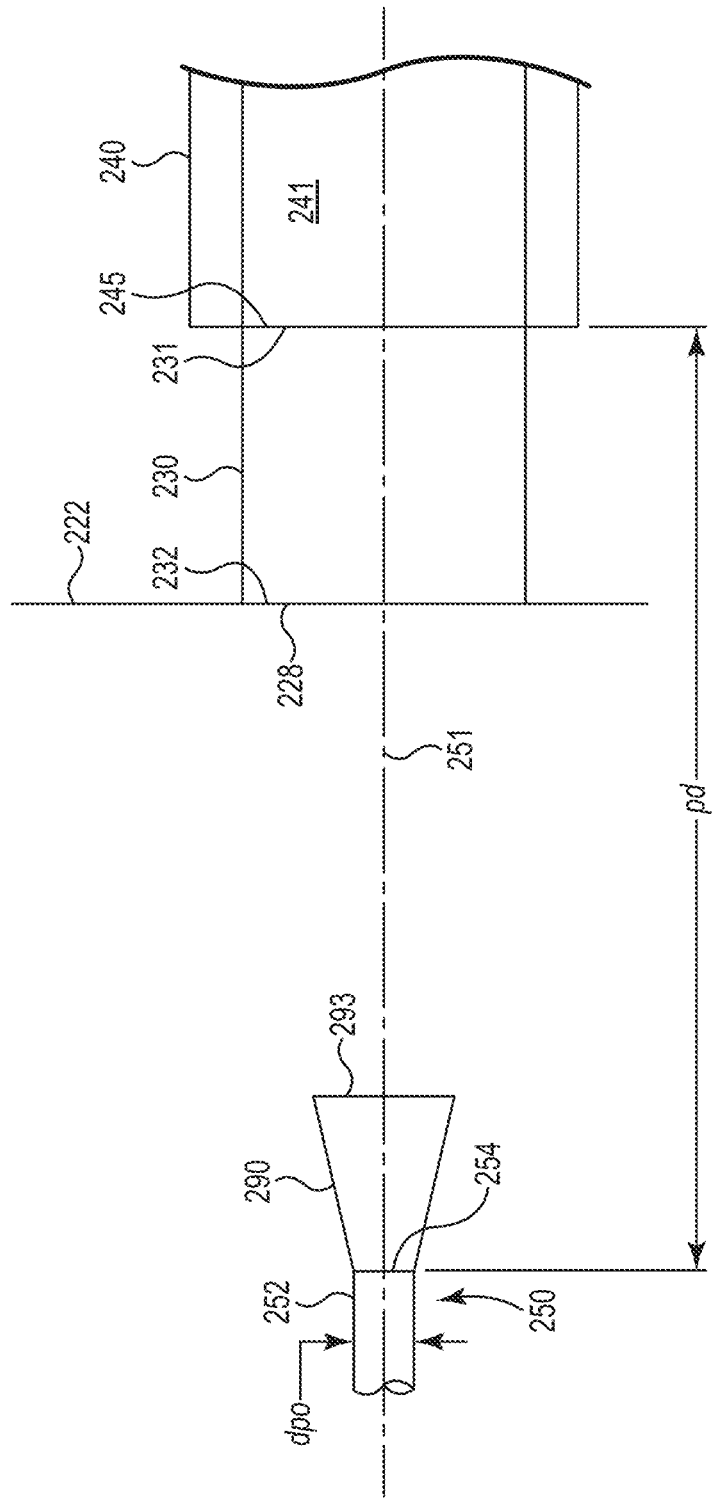
FIG. 8 is a schematic diagram of one illustrative embodiment of a relationship between a pulse generator and a filter element attached to a pulse collector in an air filter system as described herein.

The illustrative embodiment of pulse generator 250 depicted in FIG. 8 (which, for the sake of clarity, is not depicted in scale with the other components seen in FIG. 8) includes a pulse outlet 254 defined at the end of a delivery tube 252. The pulse generator 250 is configured to deliver pulses of air along a pulse axis 251 that extends from the pulse generator 250 through the aperture 228 in the tube sheet 222, the tube sheet opening 232 and the filter end opening 231 in the pulse collector 230. The pulse generator 250 includes a pulse outlet 254 located on the pulse axis 251 and through which the pulses of air are delivered along the pulse axis 251.

Although the pulse axis 251 in one or more embodiments of air filter systems described herein may be oriented and located such that the pulse axis 251 passes through a center of all of the pulse outlet 254, the aperture 228 in the tube sheet 222, the tube sheet opening 232 and the filter end opening 231 in the pulse collector 230, the filter element opening 245, and the interior volume 241 of the filter element 240, the pulse axis 251 may, in one or more embodiments, be positioned such that the pulse axis 251 does not pass through the center of one or more of those features/openings.

In one or more embodiments such as the illustrative embodiment depicted in FIG. 8, a diverging pulse guide 290 is attached to the pulse generator 250 such that air leaving the pulse outlet 254 is at least partially contained within the diverging pulse guide 290 before exiting the diverging pulse guide 290 at its open end 293. The diverging pulse guide 290 depicted in FIG. 8 is only one example of a diverging pulse guide which may be used in connection with the air filter systems described herein. Other diverging pulse guides may be used such as, e.g., those described herein, as well as those described in, e.g., U.S. Provisional Patent Application No. 61/772,198, titled DIVERGING NOZZLES AND FILTER ELEMENT CLEANING SYSTEMS USING DIVERGING NOZZLES.

The pulse outlet 254 of the pulse generators described herein is the opening through which pulses pass that is defined by opposing walls in the pulse generator 250 that do not diverge. In the illustrative embodiment depicted in FIG. 8, the pulse outlet 254 is defined by the walls of delivery tube 252 which may be parallel to each other. In one or more alternative embodiments, however, the walls of delivery tube 252 leading to the pulse outlet 254 may be converging. The pulse outlet 254 is not, however, defined by walls that are diverging as are the walls defining the diverging pulse guide 290 attached to the pulse generator 250. The converging or diverging orientation of the opposing walls defining the pulse outlets in pulse generators described herein are determined with respect to the pulse axes passing through the pulse generators, i.e., when not parallel to each other, the converging or diverging nature of the opposing walls is determined with when moving along the pulse axis in a direction towards the filter elements.

The relationship between the pulse generator and filter element in air filter systems as described herein is, in one or more embodiments, related to the pulse distance (pd as seen in FIG. 8) and the pulse outlet hydraulic diameter (dpo as seen in FIG. 8).

Figure 9:
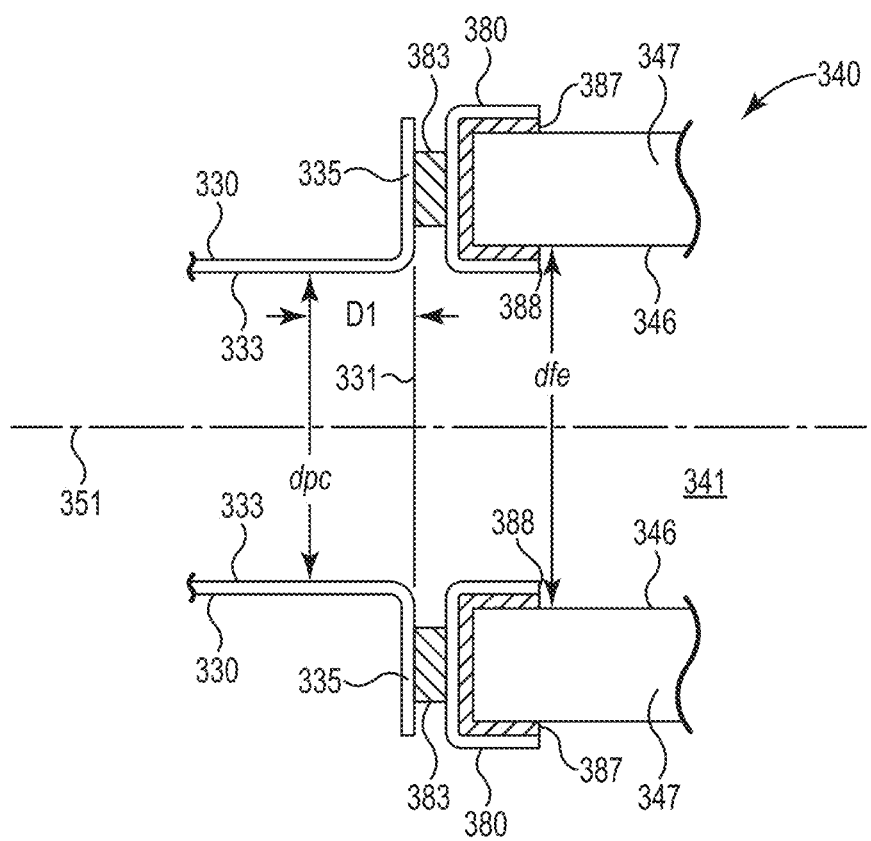
FIG. 9 is a cross-sectional view of one illustrative embodiment of a relationship between a pulse collector and a filter element at a junction between the pulse collector and the filter element.

The pulse distance (pd) is the distance measured along the pulse axis 251 from the pulse outlet 254 to the filter element opening 245, where the filter element opening 245 is the location along the pulse axis 251 at which the hydraulic diameter (dfe) of the filter element opening is determined as discussed herein in connection with FIG. 9. The pulse axis 251 extends from the pulse outlet 254 through the aperture 228, pulse collector 230 and into the interior volume 241 of the filter element 240. In one or more embodiments in which the delivery tube 252 defines the pulse outlet 254 with walls that are parallel to each other, the pulse axis 251 may be aligned with those parallel walls.

The hydraulic diameter (dpo) of the pulse outlet 254 can be determined by measuring the cross-sectional area of the pulse outlet 254, multiplying that area by four, and then dividing the resultant by the length of the perimeter of the pulse outlet 254. Calculation of the hydraulic diameter of a pulse outlet is represented by the following equation.

$$dpo = 4*(\text{area of pulse outlet})/\text{perimeter of pulse outlet}$$

In one or more embodiments of air filter systems described herein, the hydraulic diameter (dpo) of the pulse outlets may be as small as, e.g., 8 millimeters and as large as, e.g., 150 millimeters. The sizing of the pulse outlets will vary depending on many different factors such as, e.g., the size of the filter elements, flow rates through the system, etc.

In one or more embodiments of the air filter systems described herein, the lower end of the range for the pulse distance (pd) may be 30 or more times the pulse outlet hydraulic diameter (dpo). In one or more alternative embodiments of the air filter systems described herein, the lower end of the range for the pulse distance (pd) may be 35 or more times the pulse outlet hydraulic diameter (dpo). In one or more embodiments of the air filter systems described herein, the upper end of the range for the pulse distance (pd) may be 60 times or less the pulse outlet hydraulic diameter (dpo). In one or more embodiments of the air filter systems described herein, the upper end of the range for the pulse distance (pd) may be 50 times or less the pulse outlet hydraulic diameter (dpo).

One or more embodiments of the air filter systems described herein may also be characterized in terms of a relationship between hydraulic diameters of the filter element openings and the filter and openings of the pulse collectors to which the filter elements are attached. A simplified schematic diagram of the junction between a pulse collector 330 and a filter element 340 that are located along a pulse axis 351 is depicted in FIG. 9 and will be used to describe the relationship between those hydraulic diameters.

As depicted in FIG. 9, the pulse collector 330 includes an inner surface 333 that defines the filter end opening 331 of the pulse collector 330. In one or more embodiments, the pulse collector 330 may include a flange 335 that can be used as a surface against which a filter element can be sealed during use of the air filter systems described herein.

The filter element 340 depicted in FIG. 9 includes filter media 347 to which an end cap 380 is connected. In one or more embodiments, the end cap 380 may be configured to receive the filter media 347 such that an air-tight connection is provided between the filter media 347 and the end cap 380. In the depicted illustrative embodiment, sealant 387 in the form of, e.g., potting material may be used to provide an air-tight connection between the end cap 380 and the filter media 347 (although many other air-tight connections could be used to secure an end cap to filter media).

A gasket 383 is, in the depicted illustrative embodiment, located between the flange 335 of the pulse collector 330 and the end cap 380 to form a seal between the pulse collector 330 and the filter element 340. In the air filter systems described herein, one or more gaskets or other sealing structures may be used to seal the connection between a filter element and a pulse collector.

In one or more embodiments of the air filter systems described herein, the hydraulic diameter of the filter element opening (dfe) may be related to the hydraulic diameter of the filter end opening of the pulse collector (dpc).

The hydraulic diameter (dpc in FIG. 9) of the filter end opening of the pulse collectors described herein can be determined in a plane that is transverse to the pulse axis 351 at a location within 25 millimeters or less of the filter end opening 331 of the pulse collector 330 along the pulse axis 351 where the cross-sectional area of the passageway through the pulse collector 330 is smallest. With reference to FIG. 9, it is the distance DI that is 25 millimeters or less. As a result, minor changes in the cross-sectional area of the passageway through the pulse collector 330 near the junction of the pulse collector and the filter element 340 (such as, e.g., curvature of the pulse collector 330 at its filter end opening where the pulse collector 330 widens due to, e.g., manufacturing requirements) will not affect an accurate determination of the hydraulic diameter dpc of the pulse collector 330 as described herein. The hydraulic diameter dpc of the filter end opening of the pulse collector 330 is calculated according to the equation described above in connection with the hydraulic diameter of the pulse outlet, i.e., the hydraulic diameter is four times the cross-sectional area of the pulse collector at the selected location divided by its perimeter at that location.

The hydraulic diameter of the filter element opening (dfe in FIG. 9) is, likewise, determined in a plane that is transverse to the pulse axis 351. In particular, as used herein, the hydraulic diameter of the filter element opening (dfe) is determined at a location where the interior of filter media 347 of the filter element 340 is exposed to the interior volume 341 of the filter element 340 such that air can pass through the filter media 347 into and out of the interior volume 341 around a perimeter of the interior volume of the filter element 340. In one or more embodiments in which an end cap 380 is used, that location will be found at an interior edge 388 of the end cap 380. The hydraulic diameter of the filter element opening 345 is also calculated according to the equations described above, i.e., the hydraulic diameter of the filter element opening dfe is four times the cross-sectional area of the filter element opening at the selected location divided by its perimeter at that location. In the case of, e.g., pleated filter media, the cross-sectional are is defined by the locations of the inner edges of the folds making up the pleats in the filter media.

Although not depicted in the schematic diagram of FIG. 9., in one or more embodiments of the filter elements as described herein, an inner liner may be provided over the inner surface of the filter media 347 to offer e.g., protection, support, etc. to the filter media. Examples of some liners that may be used in connection with the filter elements described herein may be found in, e.g., U.S. Pat. No. 6,488,746 (Kosmider et al.), U.S. Pat. No. 8,128,724 (Mills et al.), etc.

In such an arrangement, the hydraulic diameter of the filter element opening dfe is determined using the inner surface of the inner liner.

In one or more embodiments of the air filter systems described herein, the hydraulic diameter of the filter element opening (dfe) is 112% or less of the hydraulic diameter of the filter end opening of the pulse collector (dpc). In one or more alternative embodiments of the air filter systems described herein, the hydraulic diameter of the filter element opening (dfe) is 108% or less of the hydraulic diameter of the filter end opening of the pulse collector (dpc).

In one or more embodiments of the air filter systems described herein, the hydraulic diameter of the filter element opening (dfe) is 90% or more of the hydraulic diameter of the filter end opening of the pulse collector (dpc). In one or more alternative embodiments of the air filter systems described herein, the hydraulic diameter of the filter element opening (dfe) is 95% or more of the hydraulic diameter of the filter end opening of the pulse collector (dpc).

In one or more alternative embodiments of the air filter systems described herein, the absolute value of a difference between the hydraulic diameter of the filter element opening (dfe) and the hydraulic diameter of the filter end opening of the pulse collector (dpc) is within 2% or less of the hydraulic diameter of the filter element opening.

Figure 10A:
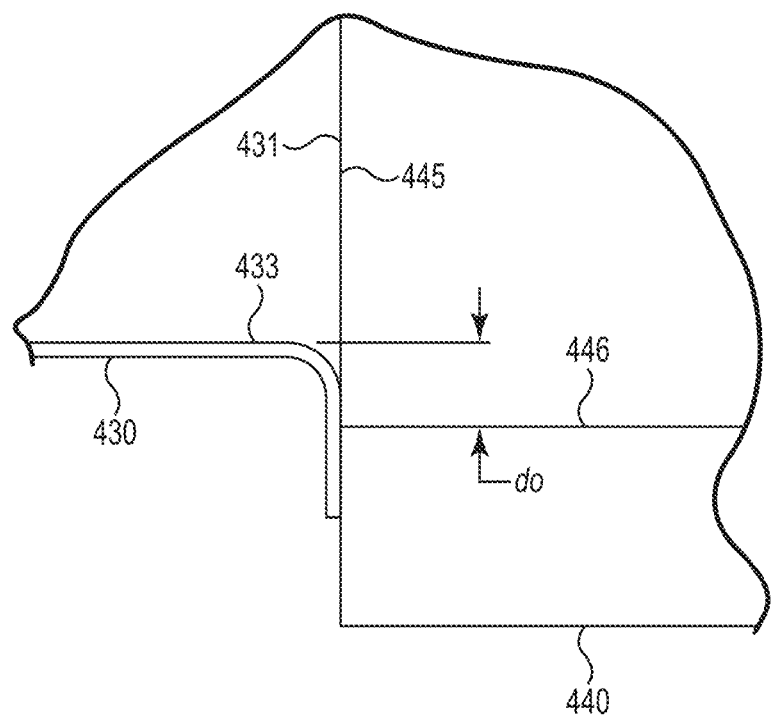
FIGS. 10A and 10B depict illustrative embodiments of offsets between the inner surfaces of a pulse collector and a filter element in an air filter system as described herein.
Figure 10B:
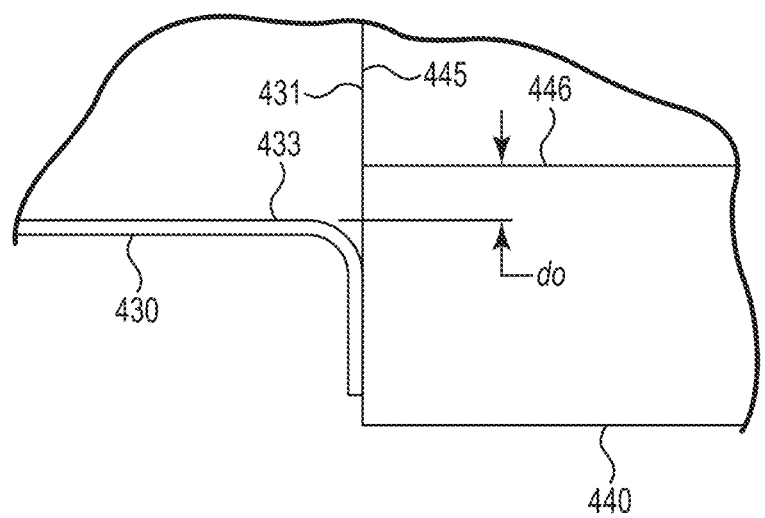

Another manner in which the air filter systems described herein may be characterized can be described in connection with FIGS. 10A and 10B, which depict cross-sectional views of enlarged portions of the interface between the filter end opening 431 of a pulse collector 430 and a filter element 440. The filter element 440 defines an inner surface 446 while the pulse collector 430 defines an inner surface 433. In one or more embodiments, the inner surface 433 of the pulse collector 430 is in alignment with the inner surface 446 of the filter element 440 at the filter end opening 445 of the filter element 440. In one or more embodiments, that alignment may be measure at the locations used to determine the hydraulic diameters of the filter end opening of the pulse collector and the filter element (dpc and dfe as described above in connection with FIG. 9).

In some instances, however, there may be an offset between the inner surface 433 of the filter end opening 431 of the pulse collector 430 and the inner surface 446 of the filter element opening 445 of the filter element 440. In particular, that offset (do in FIGS. 10A and 10B) may result in an arrangement in which the inner surface 433 and 446 do not align with each other around the perimeter of the junction between the filter end opening 431 and the filter element opening 445. FIG. 10A depicts an example in which the inner surface 433 of the filter end opening 431 of the pulse collector 430 is located inwardly from the inner surface 446 of the filter element 440 at the filter end opening 445 at an offset distance (do) as seen in FIG. 10A. FIG. 10B depicts an example in which the inner surface 446 of the filter element 440 at the filter end opening 445 is located inwardly from the inner surface 433 of the filter end opening 431 of the pulse collector 430 at an offset distance (do) as seen in FIG. 10B.

In one or more embodiments, the offset (do) between the inner surface 446 of the filter element opening 445 and the inner surface 433 of the filter end opening 431 of the pulse collector 430 is no more than 15 millimeters at any location about a perimeter of the filter element opening 445. In one or more alternative embodiments, the offset (do) between the inner surface 446 of the filter element opening 445 and the inner surface 433 of the filter end opening 431 of the pulse collector 430 is no more than 10 millimeters at any location about a perimeter of the filter element opening 445. In one or more alternative embodiments, the offset (do) between the inner surface 446 of the filter element opening 445 and the inner surface 433 of the filter end opening 431 of the pulse collector 430 is no more than 5 millimeters at any location about a perimeter of the filter element opening 445.

The air filter systems described herein include, in one or more embodiments, a pulse collector located between the tube sheet and the filter element on the dirty air chamber side of the tube sheet. In one or more embodiments, the pulse collector may be in the form of a venturi element including a throat that constricts the passageway through the pulse collector at a location between its ends as described in, e.g., one or more of the following: U.S. Pat. No. 3,942,962 (Duyckinck), U.S. Pat. No. 4,218,227 (Frey), U.S. Pat. No. 6,090,173 (Johnson et al.), U.S. Pat. No. 6,902,592 (Green et al.), U.S. Pat. No. 7,641,708 (Kosmider et al.), and US Patent Application Publication No. US2013/0305667 A1.

In one or more alternative embodiments, the pulse collectors used in the air filter systems described herein may be in the form of straight to this without any constriction or divergence between the tube sheet and the filter element. One example of such a pulse collector is depicted in, e.g., FIG. 8.

Figure 12:
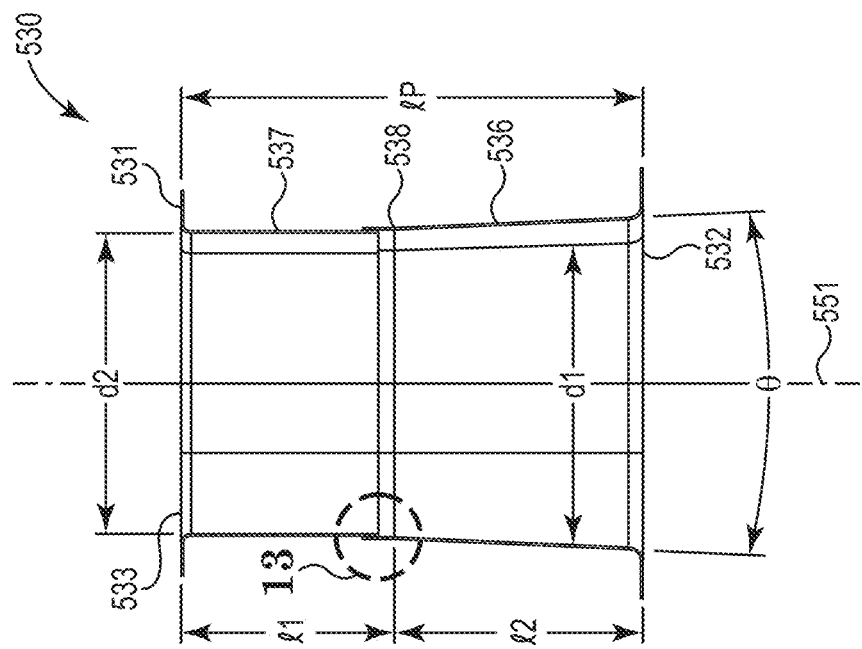
FIG. 12 is a cross-sectional view of the pulse collector of FIG. 12 taken along line 12-12 in FIG. 11.
Figure 13:
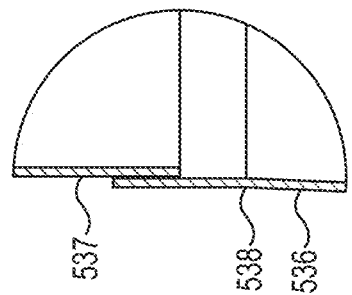
FIG. 13 is an enlarged cross-sectional view of one embodiment of a junction in the pulse collector depicted in FIG. 12.
Figure 11:
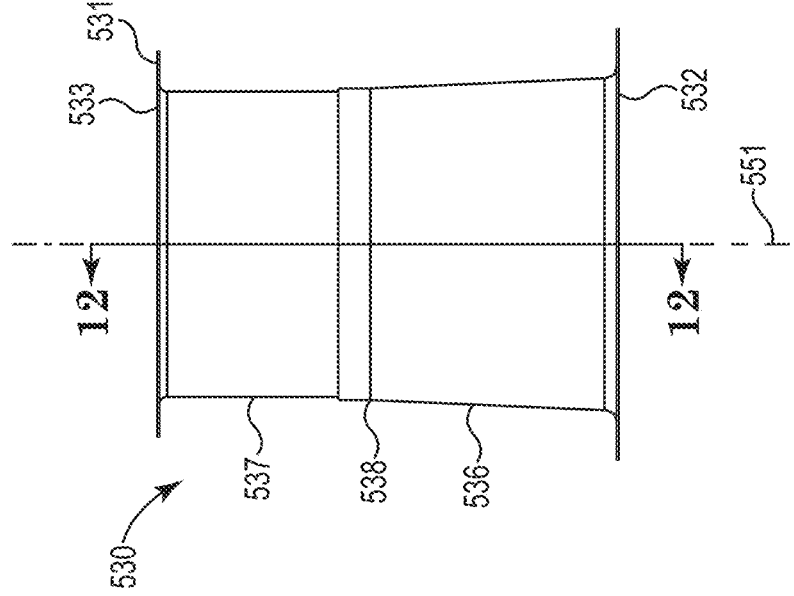
FIG. 11 depicts one illustrative embodiment of a pulse collector including a pulse section and a filter section as described herein.

In still other embodiments, the pulse collectors used in the air filter systems described herein may include a pulse section and a filter section that meet at a junction located between the filter end and the tube sheet end of the pulse collector. One illustrative embodiment of such a pulse collector 530 is depicted in FIGS. 11-13. The pulse collector 530 includes a pulse section 536 and a filter section 537 that meet at a junction 538 at a location between the filter end 531 and the tube sheet end 532 of the pulse collector 530. As with the other embodiments of pulse collectors as described herein, the pulse axis 551 extends through the pulse collector 530.

In one or more embodiments, the pulse collectors having both a pulse section and a filter section as described herein may have a pulse section 536 in which the portion of the passageway through the pulse collector 530 defined by the pulse section 536 has a hydraulic diameter (see, e.g., d1 in FIG. 12) that increases when moving from the junction 538 towards the tube sheet end 532 of the pulse collector 530. The hydraulic diameter of the pulse section 536 is determined according to the principles described herein, i.e., the hydraulic diameter of the pulse section 536 at any point along the pulse axis 551 is the product of four times the cross-sectional area of the pulse section 536 divided by the perimeter at that location.

In one or more embodiments, the pulse collectors having both a pulse section and a filter section as described herein may have a filter section 537 in which the portion of the passageway through the pulse collector 530 defined by the filter section 537 has a hydraulic diameter (see, e.g., d2 in FIG. 12) that remains constant when moving from the junction 538 towards the filter end 531 of the pulse collector 530. The hydraulic diameter of the filter section 537 is determined according to the principles described herein, i.e., the hydraulic diameter of the filter section 537 at any point along the pulse axis 551 is the product of four times the cross-sectional area of the filter section 537 divided by the perimeter at that location. It should be understood that the filter section 537 may have a hydraulic diameter that increases slightly at the filter end 531 due to manufacturing limits in the forming of the materials used to manufacture the filter section 537. The hydraulic diameter of the filter section 537 may, however, be constant over substantially its entire length with the exception of that small transition area which, in one or more embodiments, constitutes less than 10% of the overall length of the filter section 537.

In one or more embodiments of the pulse collectors described herein that include a pulse section 536 and a filter section 537, the pulse section 536 and the filter section 537 may be in the form of separate articles attached to each other at the junction 538. In one or more embodiments, the pulse section 536 and the filter section 537 may overlap each other within or near the junction 538 as seen in, e.g., the enlarged cross-sectional view of FIG. 13. It should be noted that the precise location of the junction 538 is, in the illustrative embodiment depicted in FIGS. 11-13, selected as the location at which the pulse collector 530 begins to diverge such that the hydraulic diameter increases when moving towards the tube sheet end 532.

The connection made near the junction 538 of the pulse collector 530 may be constructed using a variety of techniques and/or components. For example, the pulse section 536 and filter section 537 may be connected to each other using adhesives, clamps, mechanical fasteners, etc. In one or more embodiments, the pulse section 536 and the filter section 537 may be welded together.

In one or more embodiments of the pulse collectors described herein, the pulse collector 530 may be described as having a passageway length (see, e.g., lp in FIG. 12) measured along the pulse axis 551 that is equal to or greater than a hydraulic diameter of the filter end opening 533 at the filter end 531 of the pulse collector 530. Further, in one or more embodiments of the pulse collectors described herein, the pulse collector 530 may be described as having a passageway length measured along the pulse axis 551 that is no more than three times the hydraulic diameter of the filter end opening 533 at the filter end 531 of the pulse collector 530. These relationships between the passageway length and the hydraulic diameter of the filter end opening 533 at the filter end 531 of the pulse collector 530 apply regardless of whether or not the pulse collector has the specific construction of pulse collector 530. In other words, the relationship between the passageway length and the hydraulic diameter at the filter end opening of a pulse collector used in air filter systems described herein may, in one or more embodiments, be applied to any pulse collector including those that include a throat and/or those that have a constant hydraulic diameter along their entire length (e.g., are in the form of a simple straight wall tube).

In one or more embodiments of the pulse collectors described herein that include a pulse section 536 and a filter section 537, the filter section 537 may have a filter section length (see, e.g., $l_1$ in FIG. 12) measured along the pulse axis 551 from the filter end 531 to the junction 538 and the pulse section 536 has a pulse section length (see, e.g., $l_2$ in FIG. 12) measured along the pulse axis 551 from the tube sheet end 532 to the junction 538. In one or more embodiments of the pulse collectors described herein, the filter section length ($l_1$) is less than or equal to the pulse section length ($l_2$).

In one or more embodiments of the pulse collectors described herein that include a pulse section 536 and a filter section 537, the filter section length ($l_1$) and the pulse section length ($l_2$) may have one or more selected relationships with the hydraulic diameter of the filter end opening 533 (d2) at the filter end 531 of the pulse collector 530. For example, in one or more embodiments the filter section length ($l_1$) and the pulse section length ($l_2$) are both equal to or less than 1.5 times the hydraulic diameter of the filter end opening 533 (d2) at the filter end 531 of the pulse collector 530. In one or more alternative embodiments, the filter section length ($l_1$) and the pulse section length ($l_2$) are both equal to or less than the hydraulic diameter of the filter end opening 533 (d2) at the filter end 531 of the pulse collector 530.

As discussed in connection with the pulse section 536 of the pulse collector 530, in one or more embodiments of pulse collectors that may be used in air filter systems as described herein, the pulse section 536 may have a hydraulic diameter (d1) that increases when moving from the junction 538 to the tube sheet end 532 of the pulse collector 530. In one or more embodiments, that increasing hydraulic diameter is a function of an included angle formed by the opposing walls defining the portion of the passageway in the pulse section 536, with the opposing walls diverging from the pulse axis 551 at an included angle (see, e.g., angle θ (theta) in FIG. 12).

In one or more embodiments, that included angle may be described as being greater than 0° and less than or equal to 10°. In one or more alternative embodiments, that included angle may be described as being greater than 3° or, in one or more alternative embodiments, greater than 5°. In one or more alternative embodiments that included angle may be described as being less than or equal to 8°, and in still other embodiments, the included angle may be described as being less than or equal to 7°. Any combination of these upper and lower limits for the included angle may be used to characterize the divergence of opposing walls of a pulse section of a pulse collector as described herein.

Figure 14:
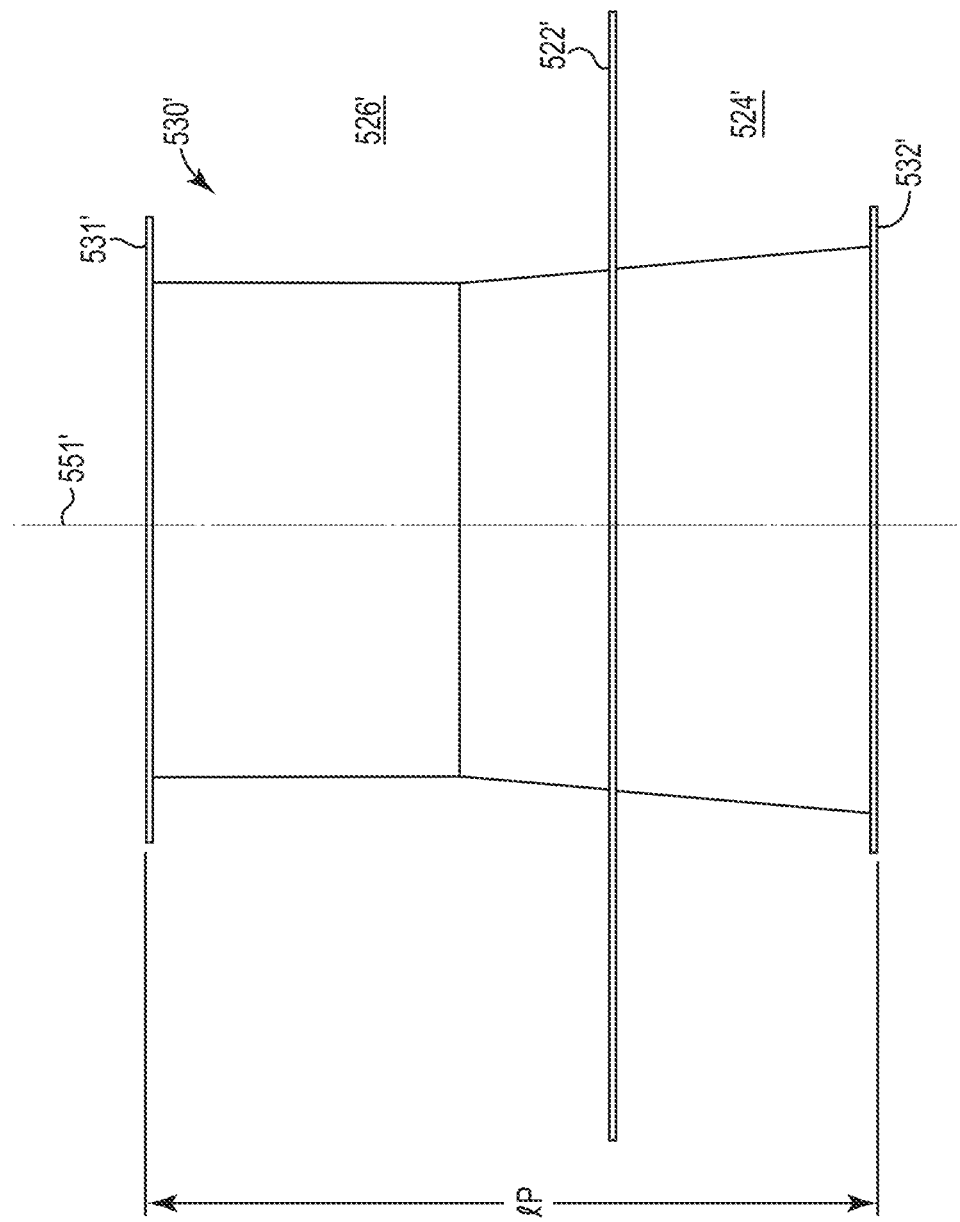
FIG. 14 depicts an alternative arrangement of a pulse collector and a tube sheet that may be used in one or more embodiments of an air filter system as described herein.

Although the illustrative embodiments of air filter systems depict arrangements in which the pulse collectors are located on the dirty air chamber side of the tube sheet with the tube sheet end of the pulse collector located on dirty air chamber side of the tube sheet, in one or more embodiments the tube sheet end of the pulse collectors may be located on the clean air chamber side of the tube sheet. One illustrative embodiment of such an arrangement is depicted in FIG. 14 including a pulse collector 530' and a tube sheet 522' that separates a clean air chamber 524' from a dirty air chamber 526'. In the depicted illustrative embodiment, the pulse collector 530' is positioned relative to the tube sheet 522' such that the tube sheet end 532' is located in the clean air chamber 524' while the filter end 531' of the pulse collector 530' remains in the dirty air chamber 526'.

The pulse collector 530' can be described as having a passageway length lp measured along a pulse axis 551' as discussed herein in connection with other illustrative embodiments. In one or more embodiments, the portion of the passageway length lp located in the clean air chamber 524' (i.e., on the clean air chamber side of the tube sheet 522') may be limited to 50% or less of the total passage way length lp.

Figure 15:
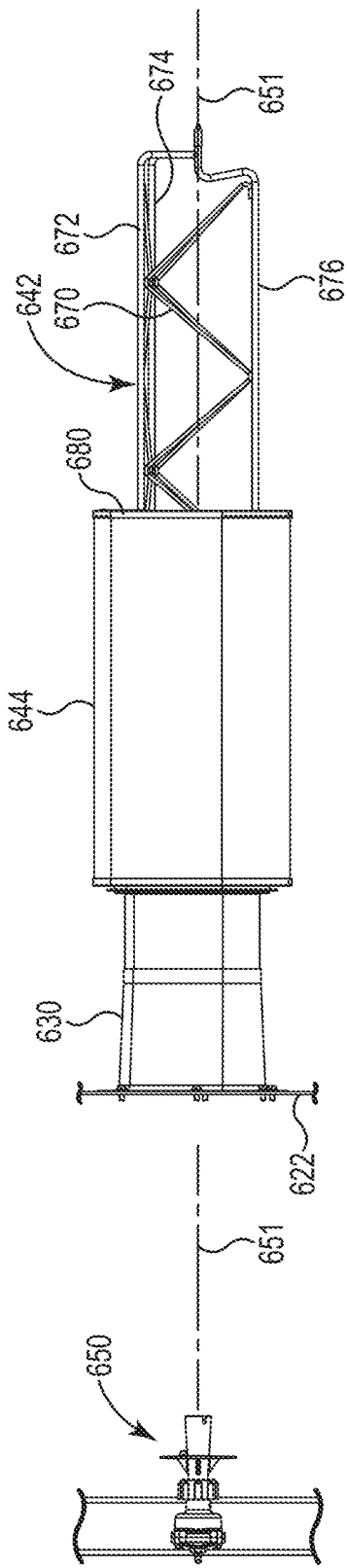
FIG. 15 depicts one illustrative embodiment of an arrangement of a pulse collector attached to a tube sheet, a filter cartridge located on a yoke extending out word from the pulse collector, and a pulse generator aligned with the pulse collector and the filter cartridge.
Figure 16:
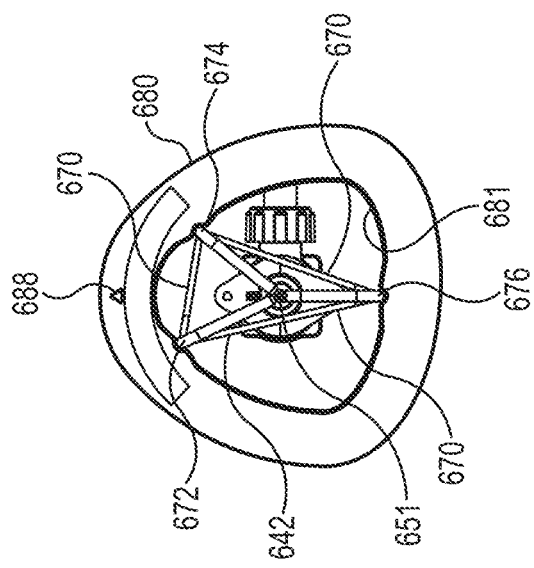
FIG. 16 is a view of the arrangement depicted in FIG. 15 taken along pulse axis 651 from right to left.
Figure 17:
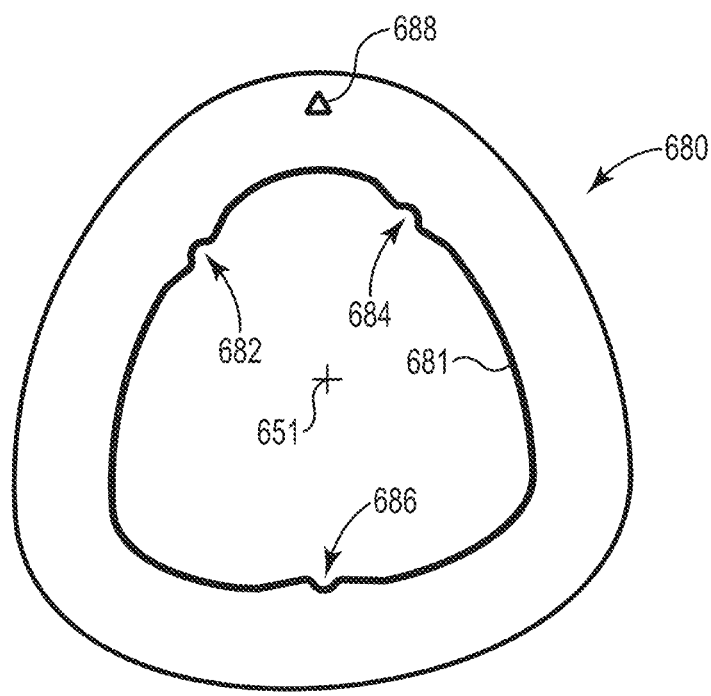
FIG. 17 depicts one illustrative embodiment of an end cap that may be used on a filter cartridge/element used in an air filter system as described herein.

Additional features that may be provided in one or more embodiments of the air filter systems described herein are depicted in connection with FIGS. 15-17. In particular, FIG. 15 depicts an arrangement that includes a tube sheet 622 having a pulse collector 630 attached thereto. A filter cartridge 644 is depicted as loaded onto a yoke 642 that extends from the pulse collector 630, with space on the yoke 642 for a second filter cartridge 644 to form a filter element attached to the pulse collector 630 as described in connection with the air filter systems described herein. The arrangement depicted in FIG. 15 further includes a pulse generator 650 aligned along a pulse axis 651 to provide for cleaning of the filter element as described herein.

The filter cartridge/element 644 depicted in FIG. 15 includes end caps 680 that may include features such as gaskets, etc. that allow the cartridge 644 to form a seal with a second cartridge that may be located on the yoke 642, as well as the pulse collector 630.

An end view of the components depicted in FIG. 15 is provided in FIG. 16, with the view taken along the pulse axis 651. Among the features depicted in the view of FIG. 15 is the noncircular shape of the end cap 680 and the associated filter element/cartridge 644.

The filter elements used in one or more embodiments of the air filter systems described herein may be supported on a yoke that extends away from the pulse collector along the pulse axis. In the illustrative embodiment of such an arrangement as seen in, e.g., FIGS. 15 and 16, the yoke 642 includes support beams 672, 674 and 676 that are aligned with the pulse axis 651. The support beams are connected to each other along the length of the yoke 642 using struts 670. In one or more embodiments, the yokes used in air filter systems as described herein may be constructed of any material or combination of materials that defines support beams that mate with and support filter elements along the yoke. For example, although the yoke 642 is constructed of rod-shaped material, in one or more alternative embodiments, the yokes used to support filter elements in air filter systems as described herein may be constructed of, e.g., sheet metal or any other suitable material.

Although the illustrative embodiment of yoke 642 includes three support beams, in one or more alternative embodiments the yoke 642 may include as few as two support beams. Unlike conventional yokes used in air filter systems, the support beams used in one or more embodiments of yokes as described herein may be arranged asymmetrically about the pulse axis 651 and extending through the yoke. That asymmetry of the support beams of yoke 642 is seen in both FIGS. 15 and 16.

The asymmetry of the support beams in the yokes used to support filter elements in air filter systems as described herein may, in one or more embodiments, be used to align the filter elements in a selected rotational orientation relative to the pulse axis extending through the yoke during placement and to assist in retention of their rotational orientation during use. Such alignment requirements may be helpful where, for example, the filter elements have orientations that may or may not properly sealed with other features such as, e.g., the filter end of a pulse collector. In particular, the location and placement of support beams 672, 674, and 676 of yoke 642 limit the placement of a filter element 644 having a shape such as that seen in, e.g., FIGS. 16 and 17 to only one selected rotational orientation relative to the pulse axis 651. For example, the end cap 680 may include alignment features 682, 684, and 686 that are configured to receive the corresponding support beams 672, 674, and 676 of the yoke 642. The alignment features aligned with their corresponding support beams only when the end cap 680 is in one selected rotational orientation relative to the pulse axis 651. In one or more embodiments, the end caps 680 may include a visual alignment aid 688 indicating, e.g., an upward direction for the end cap 680 and, therefore, for its corresponding filter element.

Ovate Filter Elements/Cartridges

In one or more embodiments, the filter elements used in connection with the air filter systems described herein may have one or more ovate cross-sectional shapes as described in, e.g., U.S. Provisional Patent Application No. 61/789,385, titled OVATE TUBULAR FILTER CARTRIDGES AND FILTER SYSTEMS USING THE SAME.

Examples of some illustrative embodiments of ovate tubular filter elements/cartridges that may be used to provide filter elements in air filter systems as described herein are depicted and described in connection with FIGS. 18-24. Although described below as filter elements, two or more of the filter elements may be combined in the air filter systems as described herein to form a single composite filter element (in which case each filter element described below may sometimes be referred to as a cartridge).

Figure 18:
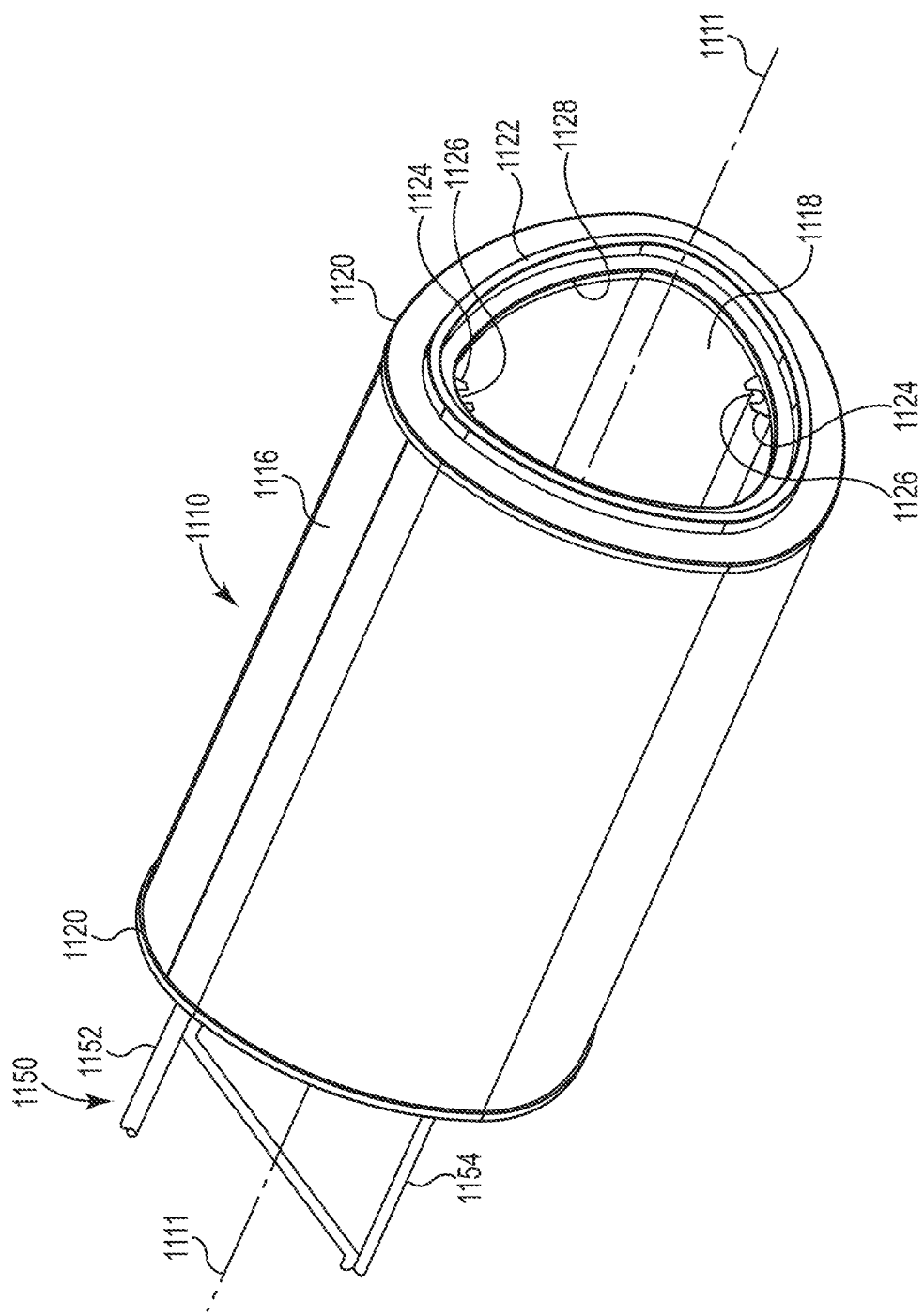
FIG. 18 is a perspective view of one illustrative embodiment of an ovate filter element/cartridge as described herein.
Figure 19:
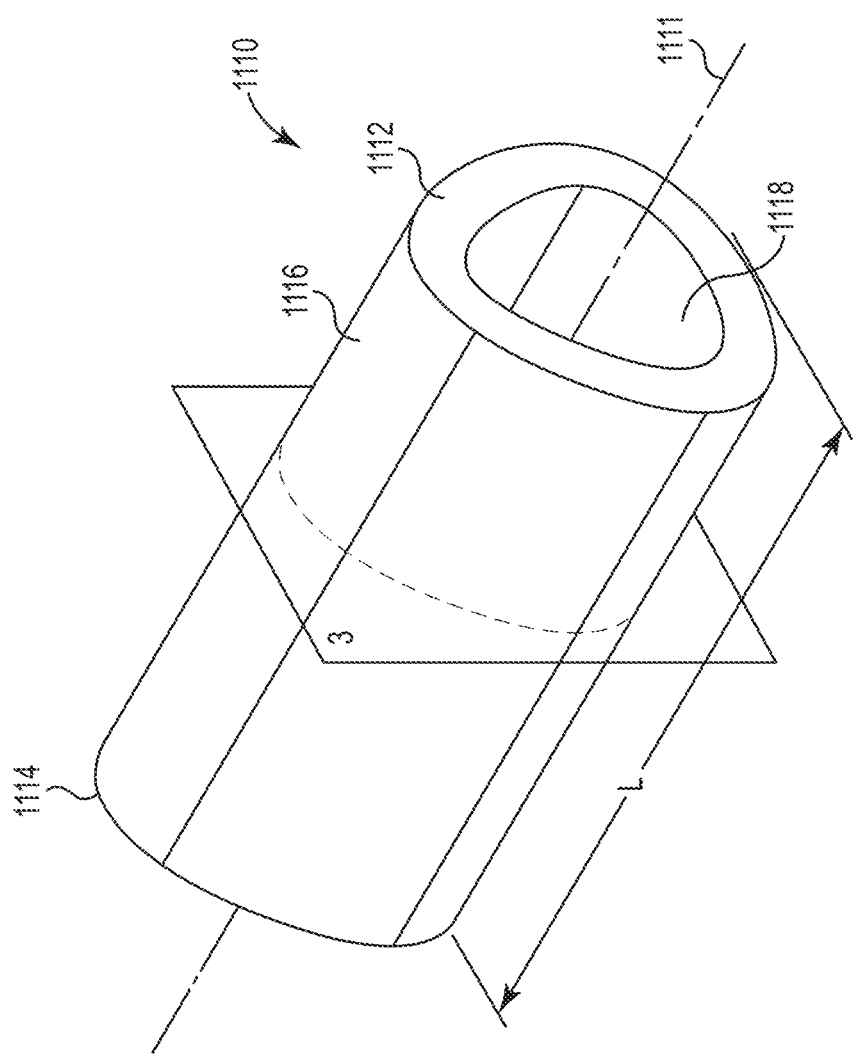
FIG. 19 is a perspective view of the filter media in the filter element/cartridge of FIG. 18.

One illustrative embodiment of an ovate filter element that may be used in one or more embodiments of the air filter systems as described herein is depicted in the perspective views of FIGS. 18 and 19. The filter element includes filter media 1110 having end caps 1120 located on each of the first end 1112 and the second end 1114 of the filter media 1110.

The end cap 1120 on first end 1112 of the filter media 1110 may, in one or more embodiments, have an opening that allows access to the interior volume of filter element. The end cap 1120 on the opposite end of the filter media 1110 may, in one or more embodiments, be closed so that it prevents access to the interior volume of the filter element and so that gas (e.g., air) entering the interior volume of the filter element through the end cap 1120 on the first end 1112 of the filter media 1110 must exit through the filter media in the filter element. In one or more alternative embodiments, both end caps 20 may be open to allow access to the interior volume of the filter element.

In one or more embodiments, a gasket 1122 may be provided on the end cap 1120 to seal the filter element over an opening in, e.g., a tube sheet, a venturi, or other structure through which gas (e.g., air) is delivered into the interior volume of the filter element.

A tube axis 1111 extends through the tubular filter element between the first end 1112 and the second end 1114. The filter media 1110 has a length L between its first end 1112 and its second end 1114 as depicted in FIG. 19. The filter media 1110 in the filter elements described herein defines an exterior surface 1116 and interior surface 1118 located around the tube axis 1111. The interior surface 1118 faces an interior volume of the filter element 1110 and the exterior surface 1116 faces away from that interior volume.

In one or more embodiments in which the ovate filter elements are used in air filter systems as described herein, the tube axis 1111 may be aligned with a pulse axis defined by a pulse generator in the air filter system. In one or more alternative embodiments in which the ovate filter elements are used in air filter systems as described herein, the tube axis 1111 may be collinear with a pulse axis defined by a pulse generator in the air filter system.

Although not depicted in the illustrative embodiment of filter element, in one or more embodiments of the filter elements as described herein, an outer liner may be provided over the exterior surface of the filter media and/or an inner liner may be provided over the inner surface of the filter media to offer e.g., protection, support, etc. to the filter media. Examples of some liners that may be used in connection with the filter elements described herein may be found in, e.g., U.S. Pat. No. 6,488,746 (Kosmider et al.), U.S. Pat. No. 8,128,724 (Mills et al.), etc. One or both the liners may, in one or more embodiments, be flexible enough to adopt the ovate cross-sectional shape of the tubular filter elements as described herein. In one or more alternative embodiments, one or both of the liners may be formed into the ovate cross-sectional shapes described herein and retain those shapes in the absence of any external force acting on the liner.

Figure 20:
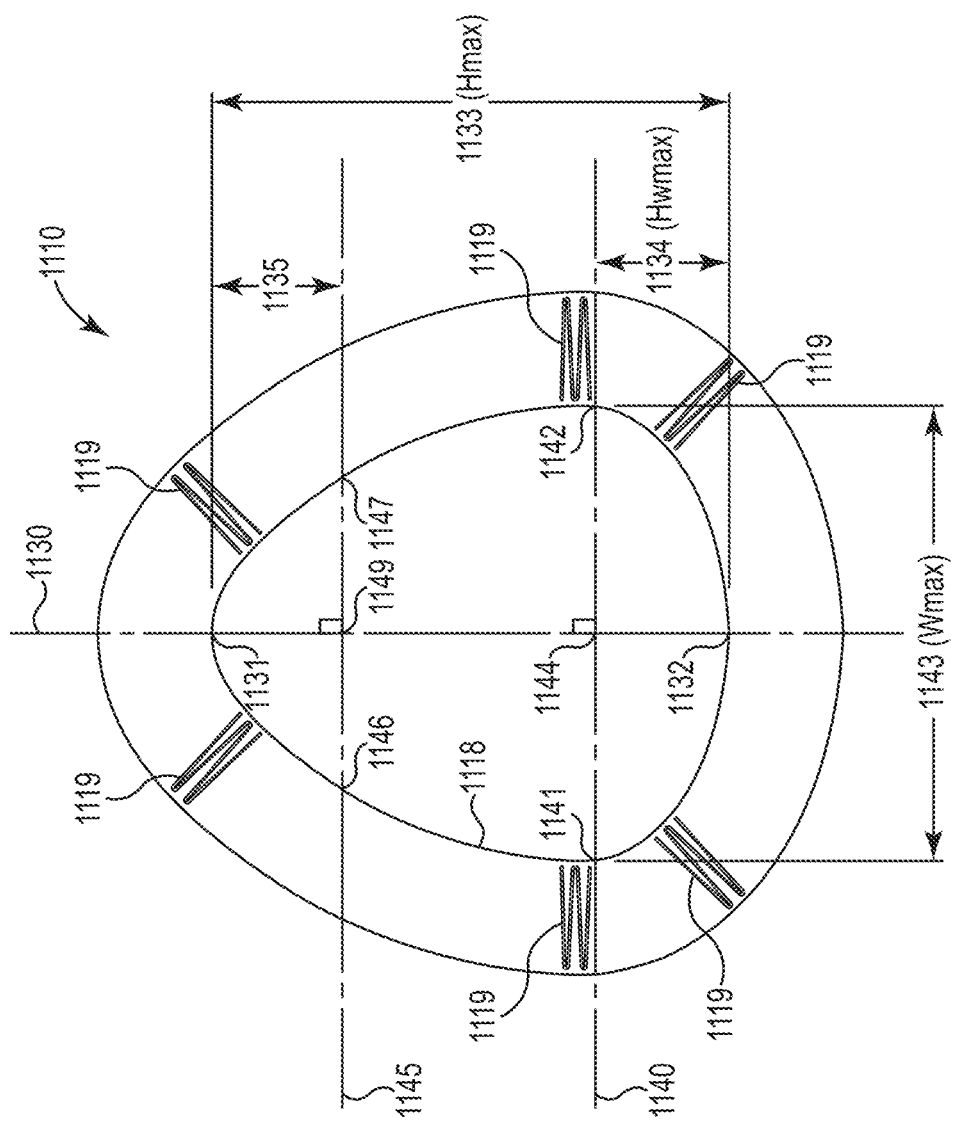
FIG. 20 is a cross-sectional view of the filter media of FIG. 19 taken in plane 3 as depicted in FIG. 19.
Figure 21:
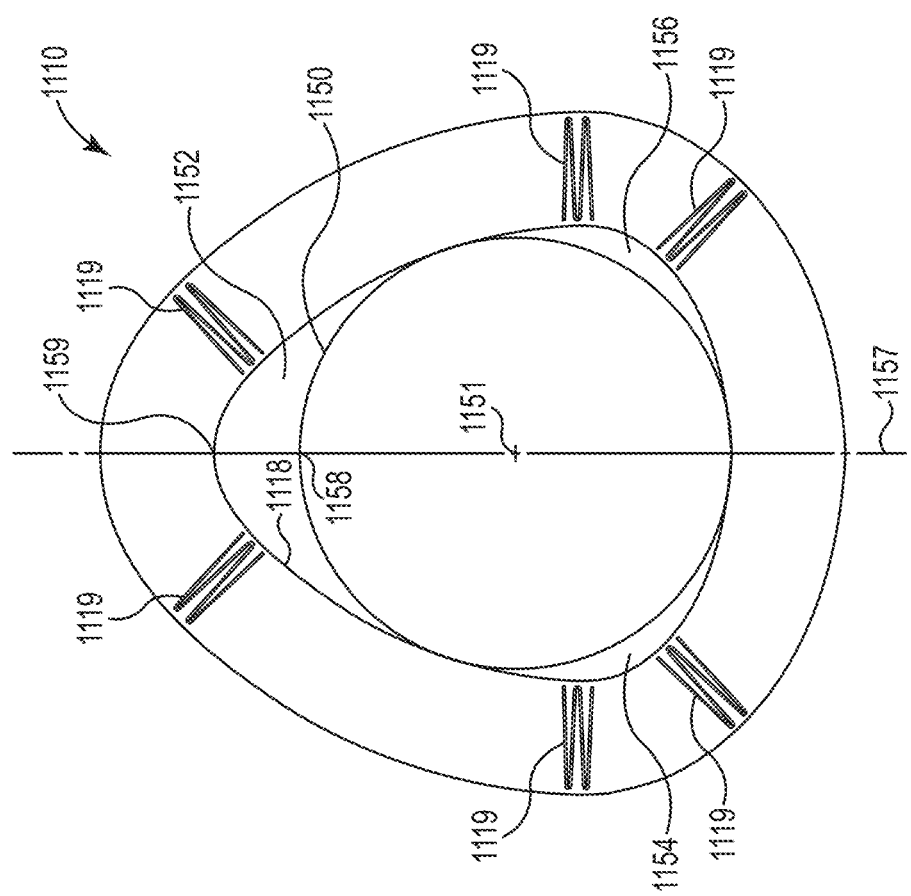
FIG. 21 is another cross-sectional view of the filter media of FIG. 19 taken in plane 3 with an inscribed circle located within the inner perimeter.

FIGS. 20 and 21 depict one illustrative embodiment of an ovate cross-section formed by tubular filter media 1110 in the filter element, with the cross-section being taken transverse to the tube axis 1111. For example, the cross-section seen in FIGS. 19 and 20 may be taken in the plane 3 depicted in FIG. 19, where plane 3 is oriented orthogonal to the tube axis 1111. The cross-sections of the tubular filter media described herein may, in one or more embodiments, be taken at any location along the length L of the filter element containing the filter media 1110. In one or more alternative embodiments, the cross-sections of the tubular filter media 1110 as described herein may be found at any location along 10% or more of the length L of the filter media. In other words, there may be portions of the length L of the tubular filter media that do not exhibit the characteristics described herein in a cross-section thereof. In one or more alternative embodiments, the cross-sections of the tubular filter media as described herein may be found at any location along 25% or more of the length L of the filter media. In one or more alternative embodiments, the cross-sections of the tubular filter media as described herein may be found at any location along 50% or more of the length L of the filter media.

In one or more embodiments, the tubular filter media 1110 may have the same shape along the entire length L, although that is not required in all embodiments (i.e., in one or more embodiments, the cross-sectional shape of the tubular filter media 30 may change over the length L).

As seen in the ovate cross-section depicted in FIGS. 20 and 21, the tubular filter media 1110 defines an inner perimeter that corresponds to the interior surface 1118 of the filter media 1110. Because the inner perimeter of the cross-section is essentially coincident with the interior surface 1118 of the filter media 1110, reference number 1118 may also be used herein to refer to the inner perimeter of the cross-section. The filter media provided in the filter elements may take a variety of different forms, but in one or more embodiments, the filter media 1110 may include pleats 1119 having internal folds located along the inner perimeter as represented by the interior surface 1118 and external folds located along the outer perimeter of the filter media 1110. In one or more embodiments, the folds in the pleats 1119 will typically be located along the surface of an inner liner that follows and/or defines the shape of the inner perimeter and the interior surface 1118 of the filter elements described herein.

Although the cross-sections of the tubular filter media in the filter elements described herein are discussed using terms such as up, down, top, bottom, etc., those terms are used only to provide a frame of reference for describing the shapes and/or features of the cross-sections. In particular, it should be understood that the filter elements described herein may be used in a filter system in any orientation. For example, in one or more embodiments, a surface identified as a "bottom" of the filter media or filter element may be found on a top surface of the filter element (relative to the direction of gravity) when the filter elements installed within a filter system.

In one or more embodiments, the ovate cross-section of the filter media 1110 has a maximum height 1133 (Hmax) that is measured between a top point 1131 and a bottom point 1132 along an axis of maximum height 1130. The top point 1131 and the bottom point 1132 are located on the inner perimeter 1118 of the cross-section of the filter media 1110 and are, in one or more embodiments, the points that are furthest apart from each other along any straight line extending across the inner perimeter 1118 of the cross-section. In some instances, the inner perimeter 1118 may have two or more axes of maximum height, each of which intersects the inner perimeter 1118 at two points that are equidistant apart from each other along two or more different straight lines extending across the inner perimeter 1118 of the cross-section. In such a case, any one of the axes of maximum height may be used to characterize the ovate cross-section as described herein.

The inner perimeter 1118 of the ovate cross-section of the filter media 1110 as described herein also has a maximum width 1143 (Wmax) measured between a first point 1141 and a second point 1142 on the inner perimeter 1118. The first point 1141 and the second point 1142 are located on an axis of maximum width 1140 that is located along a straight line perpendicular to the axis of maximum height 1130. The axis of maximum width 1140 intersects the axis of maximum height 1130 at a bottom axis intersection point 1144 where the first point 1141 and the second point 1142 at which the axis of maximum width 1140 intersects the inner perimeter 1118 are located furthest apart from each other on any straight line perpendicular to the axis of maximum height 1130.

Because of the ovate or ovoid shape of the cross-section of the filter media 1110, the bottom axis intersection point 1144 does not, in one or more embodiments, bisect the maximum height of the cross-section as measured between the top point 1131 and the bottom point 1132 along the axis of maximum height 1130.

In one or more embodiments of the tubular filter media described herein, the ovate cross-section, as depicted in, e.g., FIG. 20, may define a bottom section height 1134 (Hwmax) measured along the axis of maximum height 1130 from the bottom point 1132 to the bottom axis intersection point 1144. In one or more embodiments, the bottom section height 1134 may be less than or equal to 0.4 of the maximum height as measured along the axis of maximum height 1130 from the top point 1131 to the bottom point 1132. In one or more embodiments, the bottom section height 1134 is greater than zero. In one or more embodiments, the bottom section height 1134 is greater than or equal to 0.1 of the maximum height as measured along the axis of maximum height 1130 from the top point 1131 to the bottom point 1132.

Another manner in which the ovate cross-sections of tubular filter media of filter elements as described herein may be characterized is in terms of the length of the inner perimeter at both the top and bottom of the filter media of the filter element. For example, the inner perimeter 1118 of the cross-section of filter media of filter elements as described herein may define a bottom perimeter section containing the bottom point 1132 and extending from the first point 1141 to the second point 1142 at which the axis of maximum width 1140 intersects the inner perimeter 1118. The bottom perimeter section, i.e., the portion of the inner perimeter 1118 from the first point 1141 to the second point 1142 (and including bottom point 1132) has a bottom perimeter section length measured along the inner perimeter 1118 from the first point 1141 to the second point 1142.

The inner perimeter 1118 of the ovate cross-section of filter media 1110 of filter elements as described herein may also define a top perimeter section containing the top point 1131 at which the axis of maximum height 1130 intersects the inner perimeter 1118. The top perimeter section extends from a first end 1146 to a second end 1147 on the inner perimeter 1118, the first end 1146 being located on the inner perimeter 1118 between the first point 1141 and the top point 1131 and the second end 1147 being located on the inner perimeter 1118 between the second point 1142 and the top point 1131. The first end 1146 and the second end 1147 of the top perimeter section are the points at which a top perimeter section line 1145 intersects the inner perimeter 1118. The top perimeter section line 1145 is a straight line that is perpendicular to the axis of maximum height 1130 and intersects the axis of maximum height 1130 at a top axis intersection point 1149. The top axis intersection point 1149 is located within the inner perimeter 1118 between first point 1131 and second point 1132 at which the axis of maximum height 1130 intersects the inner perimeter 1118. The top axis intersection point 1149 defines a top section height 1135 measured along the axis of maximum height 1130 from the top axis intersection point 1149 to the top point 1131 on the inner perimeter 1118.

In one or more embodiments, the top section height 1135, e.g., the distance from the top axis intersection point 1149 to the top point 1131 in the illustrative embodiment depicted in FIG. 20, is equal to the bottom section height 1134 in the ovate cross-sections of filter media in filter elements as described herein. In one or more embodiments, the bottom perimeter section length as measured along the inner perimeter 1118 between points 1141 and 1142 (and including bottom point 1132) is greater than the top perimeter section length as measured along the inner perimeter 1118 between first end 1146 and second end 1147 (and including top point 1131). In one or more embodiments, the bottom perimeter section length may be 1.2 or more times greater than the top perimeter section length. In one or more alternative embodiments, the bottom perimeter section length may be two or more times greater than the top perimeter section length.

In one or more embodiments of the filter media 1110 in filter elements as described herein, the bottom perimeter section of the inner perimeter 1118 located between the first point 1141 and the second point 1142 may be continuously curved from the first point 1141 to the second point 1142. As used herein, "continuously curved" means that the inner perimeter 1118 includes no straight portions between first point 1141 and second point 1142, although the curvature of the inner perimeter 1118 may not be uniform along the entire length of the bottom perimeter section. In one or more alternative embodiments, the bottom perimeter section of the inner perimeter 1118 may include one or more limited portions that form a straight line, however, no portion of the bottom perimeter section of the inner perimeter 1118 lies on a straight line for a distance of more than 1 centimeter.

One or more embodiments of the filter media 1110 in filter elements as described herein may also include a line of symmetry defined by the inner perimeter 1118 of the cross-section as depicted in, e.g., FIGS. 20 and 21. In particular, filter elements having the ovate shapes described herein may, in one or more embodiments, define only a single line of symmetry. In the illustrative embodiment depicted in FIGS. 20 and 21, the inner perimeter 1118 of the cross-section of filter media 1110 defines a single line of symmetry that is coincident with the axis of maximum height 1130. Such a relationship between a line of symmetry and an axis of maximum height may not, however, necessarily be required in all embodiments described herein.

In one or more embodiments of the filter elements described herein, it may be possible to provide an inscribed circle 1150 located within the inner perimeter 1118 of the ovate cross-section of the filter media 1110, with the inscribed circles discussed herein being the largest inscribed circles that may be located within the inner perimeter 1118 of the cross-section of the filter media 1110. Because the inner perimeter 1118 is not circular in shape, the inscribed circle 1150 occupies less than all of the area within the inner perimeter 1118. In the view as seen in FIG. 21, the inscribed circle 1150 does not occupy areas 1152, 1154, and 1156 within the inner perimeter 1118 of the filter media 1110.

In one or more embodiments, the inscribed circle 1150 located within the inner perimeter 1118 may occupy 60% or more of the inner area defined by the inner perimeter 1118. In one or more alternative embodiments, the inscribed circle 1150 may occupy 70% or more of the inner area defined by the inner perimeter 1118. In one or more additional alternative embodiments, the inscribed circle 1150 may occupy 80% or more of the inner area defined by the inner perimeter 1118. In the illustrative example depicted in FIG. 21, the inscribed circle 1150 occupies more than 80% of the inner area defined by the inner perimeter 1118.

The use of inscribed circles may also provide another way in which the inner perimeters of the cross-sections of tubular filter media in filter elements as described herein may be characterized. In connection with the illustrative embodiment depicted in, e.g., FIG. 21, the inscribed circle 1150 located within the inner perimeter 1118 can be described as defining a maximum radial gap between the inscribed circle 1150 and the inner perimeter 1118. As depicted in FIG. 21, the maximum radial gap may be measured between points 1158 and 1159 located along axis 1157 that passes through the center 1151 of the inscribed circle 1150. In one or more embodiments, the maximum radial gap as measured between points 1158 and 1159 may be 0.5 or less of the diameter of the inscribed circle 1150. In one or more alternative embodiments, the maximum radial gap between an inscribed circle and the inner perimeter of a cross-section of filter media in which the inscribed circle is located may be 0.25 or less of the diameter of that inscribed circle. Limiting the maximum radial gap between an inscribed circle and the inner perimeter may, in one or more embodiments, provide improvements in pulse cleaning of a filter element having such characteristics. Further, although this characteristic is not described with respect to the other alternative illustrative embodiments described below with respect to FIGS. 21 and 22, this characteristic may be determined with respect to any tubular filter media used in filter elements as described herein and may, in one or more embodiments, be controlled to the ratios described above.

Figure 22:
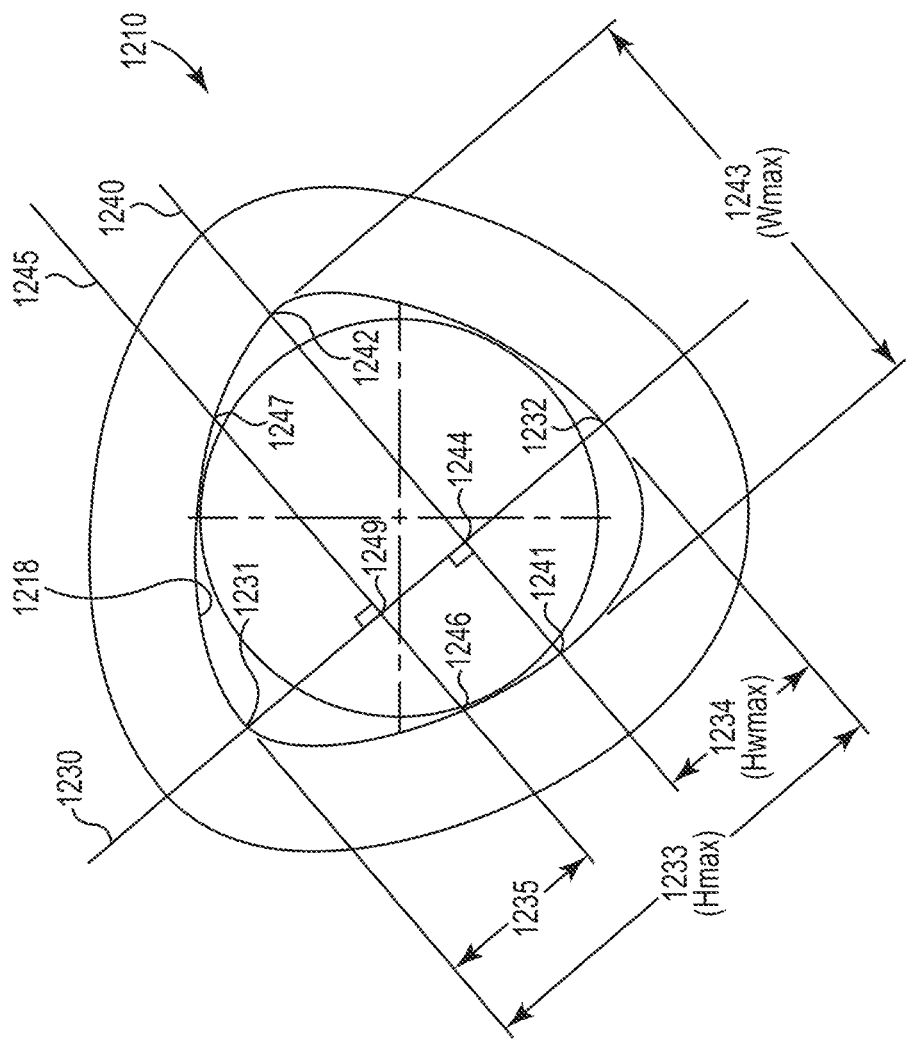
FIG. 22 is a cross-sectional view of the filter media of an alternative embodiment of an ovate filter element/cartridge as described herein.

Another illustrative embodiment of an ovate cross-section of filter media 1210 that may be used in a tubular filter element as described herein is depicted in FIG. 22. Unlike the cross-section of filter media 1110 as depicted in FIGS. 19 and 20, the ovate cross-section of filter media 1210 depicted in FIG. 22 has an inner perimeter 1218 that defines no lines of symmetry, i.e., the inner perimeter 1218 of the filter media 1210 is asymmetric.

In one or more embodiments, the ovate cross-section of the filter media 1210 has a maximum height 1233 (Hmax) that is measured between a top point 1231 and a bottom point 1232 along an axis of maximum height 1230. The top point 1231 and the bottom point 1232 are located on the inner perimeter 1218 of the cross-section of the filter media 1210 and are, in one or more embodiments, the points that are furthest apart from each other along any straight line extending across the inner perimeter 1218 of the cross-section.

The inner perimeter 1218 of the ovate cross-section of the filter media 1210 as described herein also has a maximum width 1243 (Wmax) measured between a first point 1241 and a second point 1242 on the inner perimeter 1218. The first point 1241 and the second point 1242 are located on an axis of maximum width 1240 that is located along a straight line perpendicular to the axis of maximum height 1230. The axis of maximum width 1240 intersects the axis of maximum height 1230 at a bottom axis intersection point 1244 where the first point 1241 and the second point 1242 at which the axis of maximum width 1240 intersects the inner perimeter 1218 are located furthest apart from each other on any straight line perpendicular to the axis of maximum height 1230 between top point 1231 and bottom point 1232.

Because of the ovate or ovoid shape of the cross-section of the filter media 1210, the bottom axis intersection point 1244 does not, in one or more embodiments, bisect the maximum height of the cross-section as measured between the top point 1231 and the bottom point 1232 along the axis of maximum height 1230.

In one or more embodiments of the tubular filter media described herein, the ovate cross-section, as depicted in, e.g., FIG. 22, may define a bottom section height 1234 (Hwmax) measured along the axis of maximum height 1230 from the bottom point 1232 to the bottom axis intersection point 1244. In one or more embodiments, the bottom section height 1234 may be less than or equal to 0.4 of the maximum height as measured along the axis of maximum height 1230 from the top point 1231 to the bottom point 1232. In one or more embodiments, the bottom section height 1234 is greater than zero. In one or more embodiments, the bottom section height 1234 is greater than or equal to 0.1 of the maximum height as measured along the axis of maximum height 1230 from the top point 1231 to the bottom point 1232.

Another manner in which the cross-sections of tubular filter media of filter elements as described herein may be characterized is in terms of the length of the inner perimeter at both the top and bottom of the filter media of the filter element. For example, the inner perimeter 1218 of the cross-section of filter media 1210 as described herein may define a bottom perimeter section containing the bottom point 1232 and extending from the first point 1241 to the second point 1242 at which the axis of maximum width 1240 intersects the inner perimeter 1218. The bottom perimeter section, i.e., the portion of the inner perimeter 1218 from the first point 1241 to the second point 1242 (and including bottom point 1232) has a bottom perimeter section length measured along the inner perimeter 1218 from the first point 1241 to the second point 1242.

The inner perimeter 1218 of the cross-section of filter media 1210 of one or more embodiments of filter elements as described herein may also define a top perimeter section containing the top point 1231 at which the axis of maximum height 1230 intersects the inner perimeter 1218. The top perimeter section extends from a first end 1246 to a second end 1247 on the inner perimeter 1218, the first end 1246 being located on the inner perimeter 1218 between the first point 1241 and the top point 1231 and the second end 1247 being located on the inner perimeter 1218 between the second point 1242 and the top point 1231. The first end 1246 and the second end 1247 of the top perimeter section are the points at which a top perimeter section line 1245 intersects the inner perimeter 1218 on opposite sides of the axis of maximum height 1230. The top perimeter section line 1245 is a straight line that is perpendicular to the axis of maximum height 1230 and intersects the axis of maximum height 1230 at a top axis intersection point 1249. The top axis intersection point 1249 is located within the inner perimeter 1218 between first point 1231 and second point 1232 at which the axis of maximum height 1230 intersects the inner perimeter 1218. The top axis intersection point 1249 defines a top section height 1235 measured along the axis of maximum height 1230 from the top axis intersection point 1249 to the top point 1231 on the inner perimeter 1218.

In one or more embodiments, the top section height 1235, e.g., the distance from the top axis intersection point 1249 to the top point 1231 in the illustrative embodiment depicted in FIG. 22, is equal to the bottom section height 1234 in the cross-sections of filter media in one or more embodiments of filter elements as described herein. In one or more embodiments, the bottom perimeter section length as measured along the inner perimeter 1218 between points 1241 and 1242 (and including bottom point 1232) is greater than the top perimeter section length as measured along the inner perimeter 1218 between first end 1246 and second end 1247 (and including top point 1231). In one or more embodiments, the bottom perimeter section length may be 1.2 or more times greater than the top perimeter section length. In one or more alternative embodiments, the bottom perimeter section length may be two or more times greater than the top perimeter section length.

In one or more embodiments of the filter media 1210 in filter elements as described herein, the bottom perimeter section of the inner perimeter 1218 located between the first point 1241 and the second point 1242 may be continuously curved from the first point 1241 to the second point 1242. In one or more alternative embodiments, the bottom perimeter section of the inner perimeter 1218 may include one or more limited portions that form a straight line, however, no portion of the bottom perimeter section of the inner perimeter 1218 lies on a straight line for a distance of more than 1 centimeter.

Figure 23:
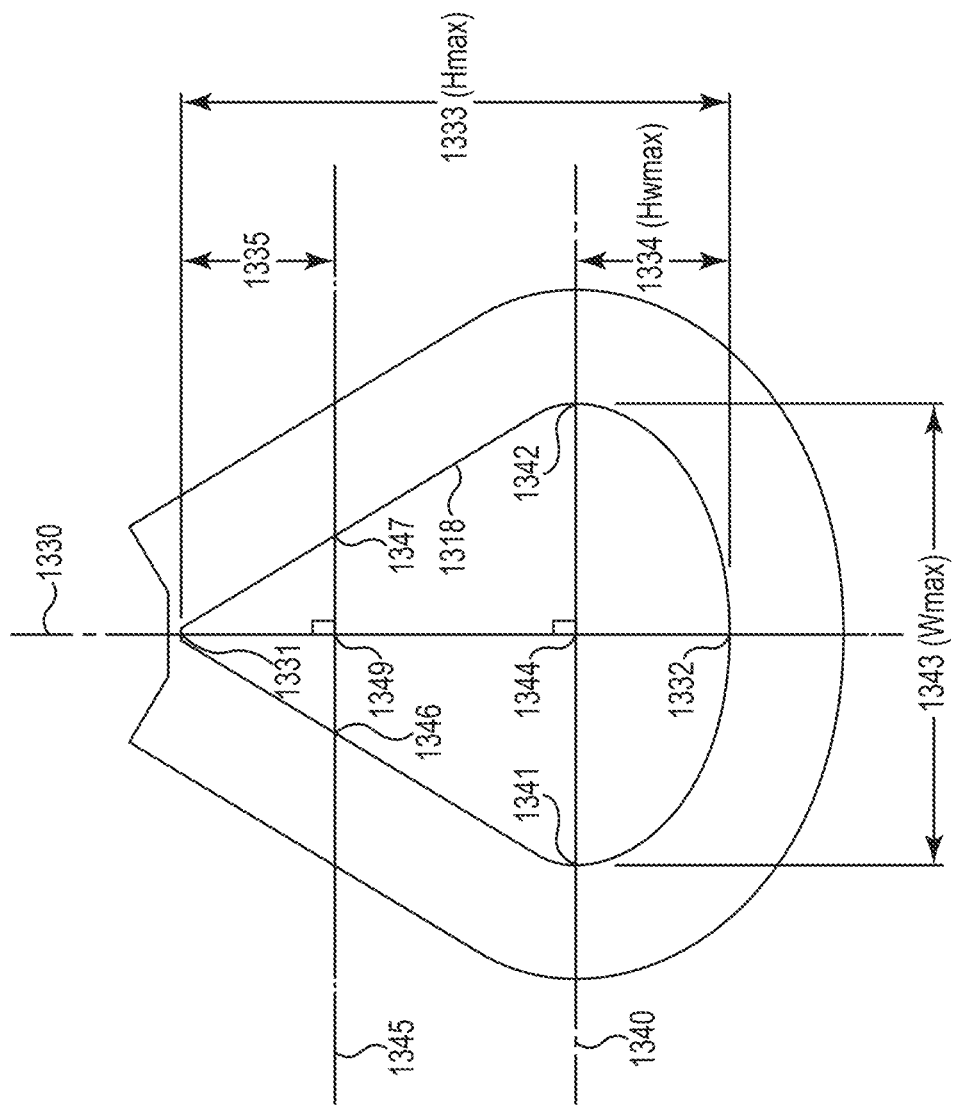
FIG. 23 is a cross-sectional view of the filter media of another alternative embodiment of an ovate filter element/cartridge as described herein.

Still another illustrative embodiment of tubular filter media 1310 having an ovate cross-section that may be used in a tubular filter element as described herein is depicted in FIG. 23. Unlike the cross-section of filter media 1110 as depicted in FIGS. 20 and 21 or the cross-section of filter media 1210 depicted in FIG. 22, the cross-section of filter media 1310 depicted in FIG. 23 has an inner perimeter 1318 that includes flat or straight sections. For the purposes of the filter elements described herein, however, the cross-section formed by filter media 1310 is ovate because it has a base wider than a top.

In one or more embodiments, the cross-section of the filter media 1310 has a maximum height 1333 (Hmax) that is measured between a top point 1331 and a bottom point 1332 along an axis of maximum height 1330. The top point 1331 and the bottom point 1332 are located on the inner perimeter 1318 of the cross-section of the filter media 1310 and are, in one or more embodiments, the points that are furthest apart from each other along any straight line extending across the inner perimeter 1318 of the cross-section.

The inner perimeter 1318 of the cross-section of the filter media 1310 as described herein also has a maximum width 1343 (Wmax) measured between a first point 1341 and a second point 1342 on the inner perimeter 1318. The first point 1341 and the second point 1342 are located on an axis of maximum width 1340 that is located along a straight line perpendicular to the axis of maximum height 1330. The axis of maximum width 1340 intersects the axis of maximum height 1330 at a bottom axis intersection point 1344 where the first point 1341 and the second point 1342 at which the axis of maximum width 1340 intersects the inner perimeter 1318 are located furthest apart from each other on any straight line perpendicular to the axis of maximum height 1330 between top point 1331 and bottom point 1332.

Because of the ovate or ovoid shape of the cross-section of the filter media 1310, the bottom axis intersection point 1344 does not, in one or more embodiments, bisect the maximum height of the cross-section as measured between the top point 1331 and the bottom point 1332 along the axis of maximum height 1330.

In one or more embodiments of the tubular filter media in filter elements described herein, the cross-section, as depicted in, e.g., FIG. 22, may define a bottom section height 1334 (Hwmax) measured along the axis of maximum height 1330 from the bottom point 1332 to the bottom axis intersection point 1344. In one or more embodiments, the bottom section height 1334 may be less than or equal to 0.4 of the maximum height as measured along the axis of maximum height 1330 from the top point 1331 to the bottom point 1332. In one or more embodiments, the bottom section height 1334 is greater than zero. In one or more embodiments, the bottom section height 1334 is greater than or equal to 0.1 of the maximum height as measured along the axis of maximum height 1330 from the top point 1331 to the bottom point 1332.

Another manner in which the cross-sections of tubular filter media of filter elements as described herein may be characterized is in terms of the length of the inner perimeter at both the top and bottom of the filter media of the filter element. For example, the inner perimeter 1318 of the cross-section of filter media 1310 as described herein may define a bottom perimeter section containing the bottom point 1332 and extending from the first point 1341 to the second point 1342 at which the axis of maximum width 1340 intersects the inner perimeter 1318. The bottom perimeter section, i.e., the portion of the inner perimeter 1318 from the first point 1341 to the second point 1342 (and including bottom point 1332) has a bottom perimeter section length measured along the inner perimeter 1318 from the first point 1341 to the second point 1342.

The inner perimeter 1318 of the cross-section of filter media 1310 of one or more embodiments of filter elements as described herein may also define a top perimeter section containing the top point 1331 at which the axis of maximum height 1330 intersects the inner perimeter 1318. The top perimeter section extends from a first end 1346 to a second end 1347 on the inner perimeter 1318, the first end 1346 being located on the inner perimeter 1318 between the first point 1341 and the top point 1331 and the second end 1347 being located on the inner perimeter 1318 between the second point 1342 and the top point 1331. The first end 1346 and the second end 1347 of the top perimeter section are the points at which a top perimeter section line 1345 intersects the inner perimeter 1318 on opposite sides of the axis of maximum height 1330. The top perimeter section line 1345 is a straight line that is perpendicular to the axis of maximum height 1330 and intersects the axis of maximum height 1330 at a top axis intersection point 1349. The top axis intersection point 1349 is located within the inner perimeter 1318 between first point 1331 and second point 1332 at which the axis of maximum height 1330 intersects the inner perimeter 1318. The top axis intersection point 1349 defines a top section height 1335 measured along the axis of maximum height 1330 from the top axis intersection point 1349 to the top point 1331 on the inner perimeter 1318.

In one or more embodiments, the top section height 1335, e.g., the distance from the top axis intersection point 1349 to the top point 1331 in the illustrative embodiment depicted in FIG. 23, is equal to the bottom section height 1334 in the cross-sections of filter media in filter elements as described herein. In one or more embodiments, the bottom perimeter section length as measured along the inner perimeter 1318 between points 1341 and 1342 (and including bottom point 1332) is greater than the top perimeter section length as measured along the inner perimeter 1318 between first end 1346 and second end 1347 (and including top point 1331). In one or more embodiments, the bottom perimeter section length may be 1.2 or more times greater than the top perimeter section length. In one or more alternative embodiments, the bottom perimeter section length may be two or more times greater than the top perimeter section length. This relationship between the bottom perimeter section length and the top perimeter section length may be one way of describing that more of the filter media 1310 faces downward than upward.

In one or more embodiments of the filter media 1310 in filter elements as described herein, the bottom perimeter section of the inner perimeter 1318 located between the first point 1341 and the second point 1342 may be continuously curved from the first point 1341 to the second point 1342. In one or more alternative embodiments, the bottom perimeter section of the inner perimeter 1318 may include one or more limited portions that form a straight line, however, no portion of the bottom perimeter section of the inner perimeter 1318 lies on a straight line for a distance of more than 1 centimeter.

The filter media 1310 is another illustrative example of a cross-section having an inner perimeter 1318 that has a line of symmetry. In particular, the inner perimeter 1318 defines, at most, only a single line of symmetry. In the illustrative embodiment depicted in FIG. 22, the single line of symmetry is coincident with the axis of maximum height 1330. Such a relationship may not, however, necessarily be required in all embodiments described herein.

Although only three different ovate cross-section shapes for filter media 1110, 1210, and 1310 in filter elements as described herein are discussed in connection with FIGS. 18 to 23, the descriptions of the various characteristics of those ovate cross-sectional shapes can be applied to an infinite number of different ovate shapes that may be used to form filter media used in tubular filter elements in air filter systems as described herein. Accordingly, the specific embodiments disclosed herein should be considered to be illustrative in nature only.

Figure 24:
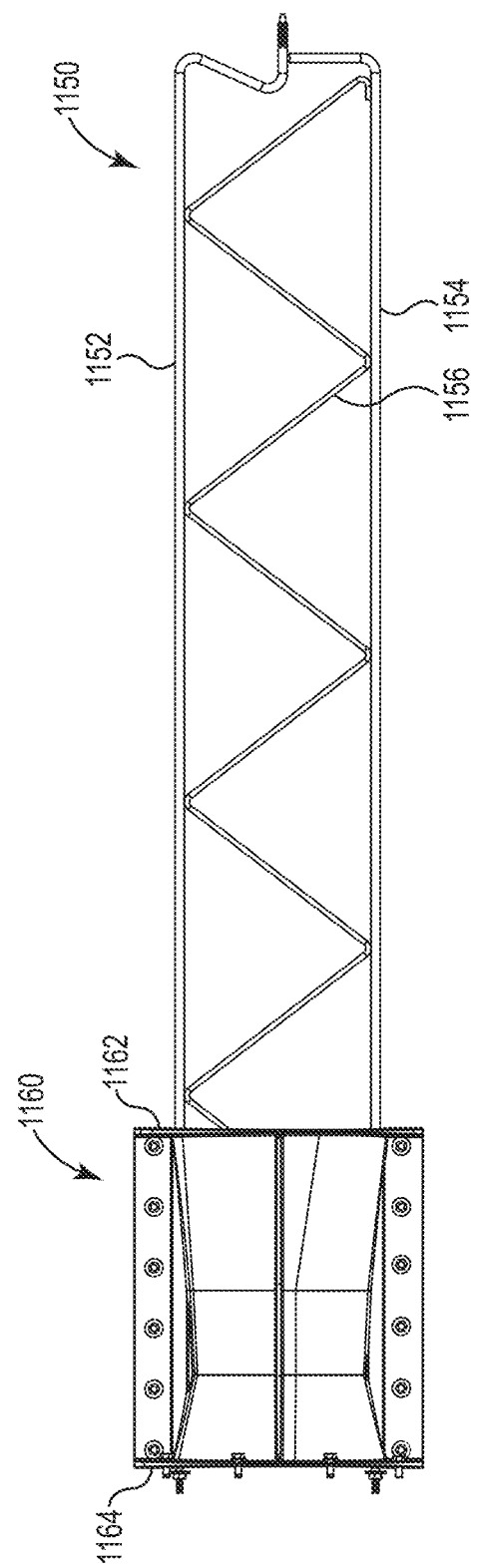
FIG. 24 is a side elevational view of one illustrative embodiment of a yoke and venturi on which a filter element/cartridge as described herein may be mounted within an air filter system.
Figure 25:
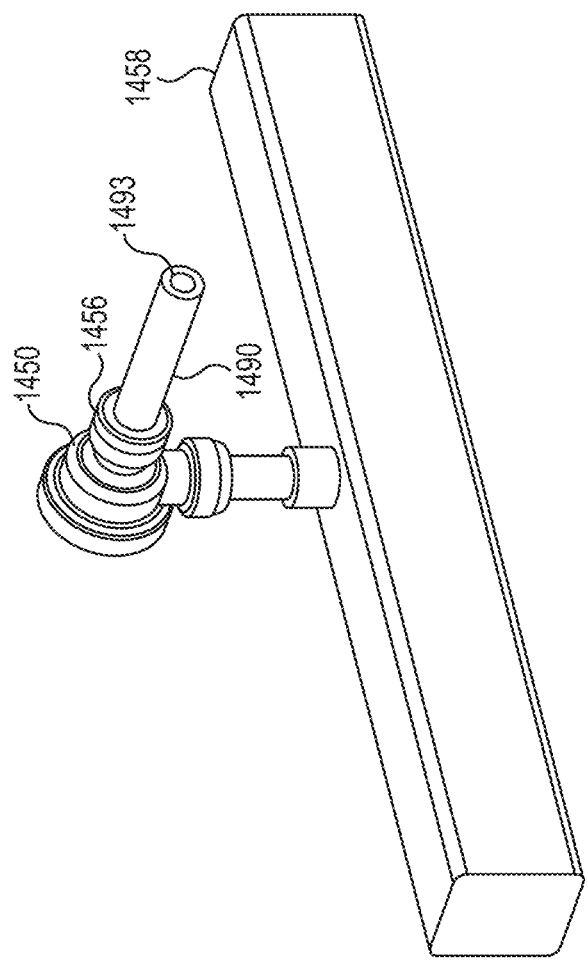
FIG. 25 is a perspective view of one illustrative embodiment of a diverging pulse guide connected to a pulse generator in fluid communication with a manifold containing pressurized gas as described herein.

Referring to FIGS. 18 and 24, in one or more embodiments of the filter elements described herein, the end caps 1120 on the filter elements may include an alignment mechanism in the form of, e.g., optional tabs 1124 in which notches 1126 are located. The notches 1126 may be sized to receive upper and lower members 1152 and 1154 of a yoke 1150 over which the filter element may be mounted in one or more embodiments of an air filter system as described herein. Each of the notches 1126 may be described as having, in one or more embodiments, an opening that faces the interior volume of the filter elements, with the notch 1126 extending towards the inner perimeter 1128 of the end cap 1120. Although each notch 1126 is formed in a single tab 1124 in the depicted embodiment, in one or more alternative embodiments, a notch 1126 may be formed between two members that protrude from the inner perimeter 1128 of the end cap 1120 where the two members forming the notch 26 are not the same structural member.

One illustrative embodiment of a yoke 1150 having upper and lower support beams 1152 and 1154 is depicted in FIG. 24. The upper and lower support beams 1152 and 1154 are structurally connected to each other by strut 1156 which, in the illustrative embodiment of FIG. 24, maybe a continuous member that provides structural support to the upper and lower support beams 1152 and 1154 and increases the rigidity of the yoke 1150. Also depicted in FIG. 24 is a venturi/pulse collector 1160 that may be used to move gas into and out of the interior volume of a filter element located on yoke 1150. The venturi/pulse collector 1160 may have a filter end 1162 against which the end cap (e.g., end cap 1120) of a filter element may be positioned and a tube sheet end 1164 configured to be attached over an aperture in a tube sheet of an air filter system as described herein.

The yoke 1150 is depicted as being partially inserted into the filter element in FIG. 18. Although depicted only on the nearest end cap 1120 in FIG. 18, in one or more embodiments, the end caps 1120 on both ends of the filter element of FIG. 18 may include tabs 1124 having notches 1126 formed therein. The use of two tabs 1124 in combination with a yoke 1150 having two support beams 1152 and 1154 may be, in one or more embodiments, be beneficial to prevent, or at least limit, rotation of a filter element about its tube axis 1111 when installed on the yoke 1150 in an air filter system as described herein.

Although one or more embodiments of the tubular filter media provided in the filter elements described herein may be in the form of pleated filter media, in one or more alternative embodiments, the tubular filter media may or may not be pleated. Further, although the filter media used in the filter elements described herein may be used to filter particulate matter from a gas/air stream, in one or more embodiments, the filter media may be further capable of removing other materials from a gas/air stream such as, e.g., chemical contaminants, etc.

Pulse Generators with Diverging Pulse Guides

In one or more embodiments, the pulse generators used in connection with the air filter systems described herein may have a diverging pulse guide having a shape as described in, e.g., U.S. Provisional Patent Application No. 61/772,198, titled DIVERGING NOZZLES AND FILTER ELEMENT CLEANING SYSTEMS USING DIVERGING NOZZLES.

Examples of some illustrative embodiments of diverging pulse guides that may be used in connection with the pulse generators in air filter systems as described herein are depicted and described in connection with FIGS. 25-29. The diverging pulse guide 1490 is attached to a pulse generator 1450 which is, in turn, attached to a manifold 1458 that supplies pressurized air to the pulse generator 1450 in an air filter system as described herein.

In particular, the diverging pulse guide 1490 is depicted as being connected to the pulse generator 1450 with a collar 1456, although many other different connection mechanisms could be used to attach to attach a diverging pulse guide 1490 to a pulse generator 1450. Although the diverging pulse guide 1490 is depicted as being connected directly to the pulse generator 1450, in one or more alternative embodiments, the diverging pulse guide 1490 may be connected to the pulse generator 1450 through one or more intermediate conduits as needed. Even though one or more intermediate conduits may be provided between the pulse generator 1450 and the diverging pulse guide 1490, the diverging pulse guide 1490 is still, for the purposes of the systems and methods described herein, still connected to the pulse generator 1450 because pressurized gas delivered by the pulse generator 1450 will eventually pass through the diverging pulse guide 1490.

Referring now to FIGS. 26-28, the illustrative embodiment of diverging pulse guide 1490 is treated in more detail. The diverging pulse guide 1490 includes a connector end 1492 and an open end 1493 with a longitudinal axis 1491 extending between the connector end 1492 and the open end 1493. A tubular wall 1494 extends between the connector end 1492 and the open end 1493 and defines an interior channel 1495 through which pressurized gas is delivered from the pulse generator 1450. In particular, pressurized gas enters the interior channel 1495 of the diverging pulse guide 1490 through the connector end 1492 and exits the interior channel 1495 through the open end 1493.

In one or more embodiments, the interior channel 1495 may have a circular cross-section taken transverse to the longitudinal axis 1491 (in which case, the channel width may be defined as the diameter of the channel 1495). In one or more embodiments, the longitudinal axis 1491 may be the same as (i.e., collinear) with the pulse axes described in connection with the air filter systems described herein. Although, in the depicted embodiments, the interior channel 1495 has a circular cross-section, variations in a circular cross-section may be allowable in diverging pulse guides as described herein. For example, in one or more embodiments, the cross-section of the interior channel 1495 may be in a shape that approximates a circle, such as, e.g., a hexagon, octagon, etc.

The interior channel 1495 of the diverging pulse guide 1490 defines a channel length LT that extends from the connector end 1492 to the open end 1493 of the diverging pulse guide 1490. The diverging pulse guide 1490 also includes a channel width that is defined by opposing interior surfaces 1496 of the tubular wall 1494 (it being understood that the opposing interior surfaces 1496 may, in one or more embodiments, be parts of the same surface that are simply located on opposite sides of the channel 1495 relative to the longitudinal axis 1491). In general, the channel length LT can be described as extending along the longitudinal axis 1491 while the channel width can be described as extending transverse to the longitudinal axis 1491.

In one or more embodiments, the interior channel can be provided in parts. In particular the interior channel 1495 may include a first section 1497 proximate the connector end 1492 and a second section 1498 proximate the open end 1493 of the diverging pulse guide. As a result, the first section 1497 is located between the second section 1498 and the connector end 1492 while the second section 1498 is located between the first section 1497 and the open end 1493 of the diverging pulse guide 1490. In one or more embodiments, the first section 1497 may begin at the connector end 1492, while in one or more alternative embodiments, the first section 1497 may begin at some location between the connector end 1492 and the second section 1498.

In one or more embodiments, the channel width of the interior channel 1495 of the diverging pulse guide 1490 may begin increasing while the opposing interior surfaces begin diverging at or near the connector end 1492. In the embodiment depicted in, e.g., FIG. 28, the opposing interior surfaces 1496 of the diverging pulse guide 1490 in the first section 1497 diverge at an angle α (alpha). In one or more embodiments, the angle α (alpha) at which the opposing interior surfaces 1496 of the first section 1497 diverge is greater than zero. In one or more embodiments, the angle α (alpha) may be 3° or less.

In one or more embodiments, the channel width of the interior channel 1495 of the diverging pulse guide 1490 continues increasing as the opposing interior surfaces 1496 continue diverging in the second section 1498. In the embodiment depicted in FIG. 28, the divergence of the opposing interior surfaces 1496 of the interior channel 1495 within second section 1498 is represented by angle β (beta) as seen in FIG. 28. In one or more embodiments of the diverging pulse guides as described herein, the opposing interior surfaces 1496 in the second section 1498 of the interior channel 1495 of the diverging pulse guide 1490 may diverge at an angle β (beta) that is greater than the angle α (alpha) at which the first section 1497 diverges. In one or more embodiments, the angle β (beta) at which the opposing interior surfaces 1496 in the second section 1498 diverge may be 1.5 or more times as large as the angle α (alpha) at which the opposing interior surfaces 1496 in the first section 1497 diverge. In one or more embodiments, the angle β (beta) at which the opposing interior surfaces 1496 in the second section 1498 diverge may be 3° or more. In one or more embodiments, the angle β (beta) at which the opposing interior surfaces 1496 in the second section 1498 diverge may be 4° or more. In one or more embodiments, the angle β (beta) at which the opposing interior surfaces 1496 in the second section 1498 diverge may be 5° or more. In one or more embodiments, the angle β (beta) at which the opposing interior surfaces 1496 in the second section 1498 diverge may be 9° or less. In one or more embodiments, the angle β (beta) at which the opposing interior surfaces 1496 in the second section 1498 diverge may be 8° or less. In one or more embodiments, the angle β (beta) at which the opposing interior surfaces 1496 in the second section 1498 diverge may be 7° or less. In one or more embodiments, the angle β (beta) at which the opposing interior surfaces 1496 in the second section 1498 diverge may be 6°.

Although the illustrative embodiment of diverging pulse guide 1490 depicted in FIGS. 26-28 includes a first section 1497 and a second section 1498 in which the opposing interior surfaces 1496 diverge at different angles, in one or more alternative embodiments, the diverging pulse guide 1490 may include an interior channel 1495 with opposing interior surfaces 1496 that diverge at the same angle along its entire length or that includes a first section 1497 in which opposing interior surfaces 1496 defining the channel width do not diverge (i.e., the opposing interior surfaces 1496 of the interior channel 1495 are substantially parallel to each other such that the interior channel width is constant along the length of the first section 1497 (with allowances for manufacturing tolerances).

In either embodiment, i.e., whether the opposing interior surfaces 1496 of the interior channel 1495 diverge at one angle along the entire length of the interior channel 1495 (in which case the second section 1498 may be described as having a length L2 equal to the total length LT of the diverging pulse guide 1490), or the opposing interior surfaces 1496 of the interior channel 1495 diverge only within a second section 1498 that occupies less than the total length LT of the diverging pulse guide 1490 (while the opposing interior surfaces 1496 in a first section 1497 do not diverge), the opposing interior surfaces 1496 defining the channel width of the channel 1495 may diverge in the diverging section from the longitudinal axis 1491 at an angle that is, at a lower end, 2° or more (where the diverging section occupies all or less than the entire length LT of the channel 1495). At the upper end of both of the two embodiments, the divergence of the opposing interior surfaces 1496 of the diverging section of the diverging pulse guide may be at an angle of 7° or less. At the upper end of both of the two embodiments, the divergence of the opposing interior surfaces 1496 of the diverging section of the diverging pulse guide may, in one or more alternative embodiments, be at an angle of 3° or more. In still other embodiments, the divergence of the opposing interior surfaces 1496 of the diverging section of the diverging pulse guide of both embodiments may be at an angle of 4° or more. In still other embodiments, the divergence of the opposing interior surfaces 1496 of the diverging section of the diverging pulse guide of both embodiments may be at an angle of 5° or more. In both of the two embodiments, the divergence of the opposing interior surfaces 1496 of the diverging section of the diverging pulse guide may be at an angle of 6°.

In one or more embodiments of the diverging pulse guides as described herein, the length L2 of the diverging second section 1498 of the interior channel 1495 (see FIG. 28) as measured along the longitudinal axis 1491 may be related to the channel width of the interior channel 1495 at the connector end 1492 of the diverging pulse guide 1490 (where the diameter of the interior channel 1495 at the connector end 1492 is measured transverse to the longitudinal axis 1491). The relationship between the channel width of the interior channel 1495 and the length L2 of the diverging second section 1498 holds for those embodiments in which the diverging second section 1498 occupies all or less than the total length LT of the channel 1495. For example, in one or more embodiments, the length L2 of the diverging second section 1498 of the interior channel 1495 may be at least as long as the channel width of the interior channel 1495 at the connector end 1492. In one or more other embodiments, the length L2 of the diverging second section 1498 of the interior channel 1495 may be two or more times the channel width of the interior channel 1495 at the connector end 1492. In still other embodiments, the length L2 of the diverging second section 1498 of the interior channel 1495 may be three or more times the channel width of the interior channel 1495 at the connector end 1492. In yet other embodiments, the length L2 of the diverging second section 1498 of the interior channel 1495 may be four or more times the channel width of the interior channel 1495 at the connector end 1492.

Another feature that may be provided in one or more embodiments of the diverging pulse guides as described herein are threads 1499 located at the connector end 1492 of the diverging pulse guide 1490 and extend from the connector end 1492 towards the open end 1493. The threads 1499 may be used to connect the diverging pulse guide 1490 to a pulse generator or to an intermediate conduit interposed between the diverging pulse guide 1490 and a pulse generator. Although the diverging pulse guide 1490 includes threads to assist in connecting the diverging pulse guide 1490 to a pulse generator, many other fluid connection structures may be used to connect the diverging pulse guide 1490 to a pulse generator, such as, e.g., quick connect couplings, etc. In the depicted embodiment, the threads 1499 are located on the exterior surface of the diverging pulse guide 1490. In one or more alternative embodiments, however, the threads or other connection mechanism may be located on the interior surface 1496 of the diverging pulse guide 1490.

Referring to FIG. 29, one illustrative embodiment of a connection of a diverging pulse guide 1490 to a delivery tube 1452 of a pulse generator 1450 is depicted. The diverging pulse guide 1490 includes threads 1499 on its exterior surface at the connector end 1492 of the diverging pulse guide 1490. Those threads 1499 mate with a set of internal threads 1459 on the interior surface of the delivery tube of the pulse generator 1450 to retain the diverging pulse guide 1490 in fluid communication with the pulse generator 1450.

In one or more embodiments, the interior diameter of the delivery tube 1452 of the pulse generator 1450 as defined by the interior wall 1453 may be substantially equal to the interior diameter of the diverging pulse guide 1490 at the connector end 1492 such that gas flowing through the pulse generator 1450 into the diverging pulse guide 1490 sees little or no discontinuity when moving from the delivery tube 1452 of the pulse generator 1450 to the diverging pulse guide 1490. Such a smooth transition between the pulse generator 1450 and the diverging pulse guide 1490 may be useful in limiting pressure losses, reducing noise, etc.

For those embodiments of the diverging pulse guides described herein in which the opposing interior surfaces 1496 diverge beginning at the free end 1492 of the pulse guide 1490 and in which the opposing interior walls 1453 of the pulse generator 150 (e.g., the delivery tube 1452) to which the pulse guide 1490 is attached are either parallel to each other or converging as described herein, the pulse generator 1450 can be described as having a pulse outlet 1454 that is located essentially at the connector end 1492 of the pulse guide 1490.

For those embodiments of the diverging pulse guides described herein that include a first section 1497 in which the opposing interior surfaces 1496 do not diverge, the pulse guide 1490 may effectively move the pulse outlet 1454 (see, e.g., FIG. 29) to a location between the connector end 1492 and the open end 1493 of the pulse guide 1490 at which the opposing interior surfaces/walls 1496 of the pulse guide 1490 do begin to diverge.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the air filter systems and components thereof, as well as methods of using the same, are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A filtering system comprising:
a housing comprising a tube sheet separating the housing into a dirty air chamber and a clean air chamber;
an aperture in the tube sheet, wherein air passing from the dirty air chamber into the clean air chamber passes through the aperture;
a pulse generator positioned to deliver pulses of air through the clean air chamber and into the aperture in the tube sheet, wherein the pulse generator is configured to deliver the pulses of air along a pulse axis that extends from the pulse generator through the aperture in the tube sheet, wherein the pulse generator comprises a pulse outlet located on the pulse axis, the pulse outlet defined by opposing walls that do not diverge with respect to the pulse axis, and wherein the pulse outlet defines a pulse outlet hydraulic diameter;
a pulse collector defining a passageway that extends through the pulse collector from a filter end opening at a filter end of the pulse collector to a tube sheet opening at a tube sheet end of the pulse collector, wherein the tube sheet end of the pulse collector is attached to the tube sheet such that the tube sheet opening of the pulse collector is aligned with the aperture such that the pulse axis extends through the filter end opening and the tube sheet opening of the pulse collector, wherein air passing from the dirty air chamber into the clean air chamber through the aperture in the tube sheet must pass through the passageway of the pulse collector from the filter end opening to the tube sheet opening; and
a filter element attached to the filter end of the pulse collector such that a junction between an end of the filter element and the filter end of the pulse collector is located in the dirty air chamber;
wherein the pulse collector comprises a filter section and a pulse section, wherein the filter section and the pulse section meet at a junction located between the filter end opening and the tube sheet end opening of the pulse collector;
wherein a pulse distance measured along the pulse axis from the pulse outlet to the filter end opening is 30 or more times and 60 or less times the pulse outlet hydraulic diameter;
and wherein the filter section comprises a filter section length measured along the pulse axis from the filter end opening to the junction and the pulse section comprises a pulse section length measured along the pulse axis from the tube sheet end opening to the junction, wherein the filter section length and the pulse section length are both equal to or less than 1.5 times a hydraulic diameter of the filter end opening of the pulse collector.

2. A system according to claim 1, wherein the filter section length and the pulse section length are both equal to or less than the hydraulic diameter of the filter end opening of the pulse collector.

3. A system according to claim 1, wherein the filter section length is less than or equal to the pulse section length.

4. A system according to claim 1, wherein the passageway defined by the filter section comprises a hydraulic diameter that remains constant when moving along the pulse axis from the junction to the filter end.

5. A system according to claim 1, wherein the passageway defined by the pulse section comprises a hydraulic diameter that increases when moving along the pulse axis from the junction to the tube sheet opening.

6. A system according to claim 5, wherein the pulse section comprises opposing walls defining the passageway in the pulse section, wherein the opposing walls diverge from the pulse axis at an included angle that is less than or equal to ten (10) degrees.

7. A system according to claim 1, wherein the filter section and the pulse section comprise separate articles attached to each other at the junction.

8. A system according to claim 1, wherein the pulse collector comprises a passageway length measured along the pulse axis from the filter end opening to the tube sheet opening that is equal to or greater than the hydraulic diameter of the filter end opening of the pulse collector.

9. A system according to claim 1, wherein the filter section and the pulse section comprise separate articles attached to each other at the junction, and wherein the filter section length is less than or equal to the pulse section length.

10. A system according to claim 1, wherein the filter section and the pulse section comprise separate articles attached to each other at the junction, and wherein the passageway defined by the filter section comprises a hydraulic diameter that remains constant when moving along the pulse axis from the junction to the filter end.

11. A system according to claim 1, wherein the filter section and the pulse section comprise separate articles attached to each other at the junction, and wherein the passageway defined by the pulse section comprises a hydraulic diameter that increases when moving along the pulse axis from the junction to the tube sheet opening.

12. A system according to claim 1, wherein the filter section and the pulse section comprise separate articles attached to each other at the junction, and wherein the pulse collector comprises a passageway length measured along the pulse axis from the filter end opening to the tube sheet opening that is equal to or greater than the hydraulic diameter of the filter end opening of the pulse collector.

13. A system according to claim 1, wherein the filter section length and the pulse section length are both equal to or less than the hydraulic diameter of the filter end opening of the pulse collector, and wherein the passageway defined by the filter section comprises a hydraulic diameter that remains constant when moving along the pulse axis from the junction to the filter end.

14. A system according to claim 1, wherein the filter section length and the pulse section length are both equal to or less than the hydraulic diameter of the filter end opening of the pulse collector, and wherein the passageway defined by the pulse section comprises a hydraulic diameter that increases when moving along the pulse axis from the junction to the tube sheet opening.

15. A system according to claim 1, wherein the filter section length and the pulse section length are both equal to or less than the hydraulic diameter of the filter end opening of the pulse collector, and wherein the pulse collector comprises a passageway length measured along the pulse axis from the filter end opening to the tube sheet opening that is equal to or greater than a hydraulic diameter of the filter end opening of the pulse collector.

16. A system according to claim 1, wherein the passageway defined by the filter section comprises a hydraulic diameter that remains constant when moving along the pulse axis from the junction to the filter end, and wherein the passageway defined by the pulse section comprises a hydraulic diameter that increases when moving along the pulse axis from the junction to the tube sheet opening.

17. A filtering system comprising:
a housing comprising a tube sheet separating the housing into a dirty air chamber and a clean air chamber;
an aperture in the tube sheet, wherein air passing from the dirty air chamber into the clean air chamber passes through the aperture;
a pulse generator positioned to deliver pulses of air through the clean air chamber and into the aperture in the tube sheet, wherein the pulse generator is configured to deliver the pulses of air along a pulse axis that extends from the pulse generator through the aperture in the tube sheet, wherein the pulse generator comprises a pulse outlet located on the pulse axis, the pulse outlet defined by opposing walls that do not diverge with respect to the pulse axis, and wherein the pulse outlet defines a pulse outlet hydraulic diameter;
a pulse collector defining a passageway that extends through the pulse collector from a filter end opening at a filter end of the pulse collector to a tube sheet opening at a tube sheet end of the pulse collector, wherein the tube sheet end of the pulse collector is attached to the tube sheet such that the tube sheet opening of the pulse collector is aligned with the aperture such that the pulse axis extends through the filter end opening and the tube sheet opening of the pulse collector, wherein air passing from the dirty air chamber into the clean air chamber through the aperture in the tube sheet must pass through the passageway of the pulse collector from the filter end opening to the tube sheet opening; wherein the pulse collector comprises a filter section and a pulse section, wherein the filter section and the pulse section meet at a junction located between the filter end opening and the tube sheet end opening of the pulse collector; and
a filter element attached to the filter end of the pulse collector such that a junction between an end of the filter element and the filter end of the pulse collector is located in the dirty air chamber;
wherein a pulse distance measured along the pulse axis from the pulse outlet to the filter end opening is 30 or more times and 60 or less times the pulse outlet hydraulic diameter;
wherein the filter section comprises a filter section length measured along the pulse axis from the filter end opening to the junction and the pulse section comprises a pulse section length measured along the pulse axis from the tube sheet end opening to the junction;
wherein the pulse section length is equal to or less than 1.5 times a hydraulic diameter of the filter end opening of the pulse collector;
wherein the filter section length is equal to or less than the hydraulic diameter of the filter end opening of the pulse collector;
and wherein the passageway defined by the filter section comprises a hydraulic diameter that remains constant when moving along the pulse axis from the junction to the filter end.

18. A system according to claim 17, wherein the pulse section length is equal to or less than the hydraulic diameter of the filter end opening of the pulse collector.

19. A system according to claim 17, wherein the passageway defined by the pulse section comprises a hydraulic diameter that increases when moving along the pulse axis from the junction to the tube sheet opening.

20. A system according to claim 19, wherein the pulse section comprises opposing walls defining the passageway in the pulse section, wherein the opposing walls diverge from the pulse axis at an included angle that is less than or equal to ten (10) degrees.

21. A system according to claim 17, wherein the filter section and the pulse section comprise separate articles attached to each other at the junction.

22. A system according to claim 17, wherein the pulse collector comprises a passageway length measured along the pulse axis from the filter end opening to the tube sheet opening that is equal to or greater than the hydraulic diameter of the filter end opening of the pulse collector.

23. A system according to claim 17, wherein the filter section and the pulse section comprise separate articles attached to each other at the junction, and wherein the passageway defined by the pulse section comprises a hydraulic diameter that increases when moving along the pulse axis from the junction to the tube sheet opening.

24. A system according to claim 17, wherein the filter section and the pulse section comprise separate articles attached to each other at the junction, and wherein the pulse collector comprises a passageway length measured along the pulse axis from the filter end opening to the tube sheet opening that is equal to or greater than the hydraulic diameter of the filter end opening of the pulse collector.

25. A system according to claim 17, wherein the pulse section length is equal to or less than the hydraulic diameter of the filter end opening of the pulse collector.

26. A system according to claim 17, wherein the pulse section length is equal to or less than the hydraulic diameter of the filter end opening of the pulse collector, and wherein the passageway defined by the pulse section comprises a hydraulic diameter that increases when moving along the pulse axis from the junction to the tube sheet opening.

27. A system according to claim 17, wherein the pulse section length is equal to or less than the hydraulic diameter of the filter end opening of the pulse collector, and wherein the pulse collector comprises a passageway length measured along the pulse axis from the filter end opening to the tube sheet opening that is equal to or greater than a hydraulic diameter of the filter end opening of the pulse collector.

* * * * *